United States Patent
Yamano

(10) Patent No.: US 10,193,418 B2
(45) Date of Patent: Jan. 29, 2019

(54) ROTARY POWER GENERATING APPARATUS AND ELECTRIC GENERATING APPARATUS

(71) Applicant: Katsushito Yamano, Hachioji (JP)

(72) Inventor: Katsushito Yamano, Hachioji (JP)

( * ) Notice: Subject to any disclaimer, the term of this patent is extended or adjusted under 35 U.S.C. 154(b) by 60 days.

(21) Appl. No.: 15/127,613

(22) PCT Filed: Mar. 13, 2015

(86) PCT No.: PCT/JP2015/057489
§ 371 (c)(1),
(2) Date: Sep. 20, 2016

(87) PCT Pub. No.: WO2015/146636
PCT Pub. Date: Oct. 1, 2015

(65) Prior Publication Data
US 2017/0133908 A1     May 11, 2017

(30) Foreign Application Priority Data

Mar. 28, 2014 (JP) .................................. 2014-068875
Mar. 2, 2015 (JP) .................................. 2015-039761

(51) Int. Cl.
| | |
|---|---|
| *H02K 1/00* | (2006.01) |
| *H02K 7/18* | (2006.01) |
| *F03G 3/00* | (2006.01) |
| *H02K 53/00* | (2006.01) |
| *H02N 11/00* | (2006.01) |

(Continued)

(52) U.S. Cl.
CPC ............. *H02K 7/1815* (2013.01); *F03G 3/00* (2013.01); *H02K 1/17* (2013.01); *H02K 1/34* (2013.01); *H02K 53/00* (2013.01); *H02N 11/008* (2013.01); *Y10S 74/09* (2013.01)

(58) Field of Classification Search
CPC ...... H02K 53/00; H02K 7/1815; H02K 7/075; H02K 1/34; F03G 7/10; F03G 3/00
USPC ......... 185/27, 32, 33; 290/1 R, 1 A; 310/46, 310/24, 23
See application file for complete search history.

(56) References Cited

U.S. PATENT DOCUMENTS 5,287,518 A * 2/1994 Miller .................... F02B 63/04
                                                    310/168
5,469,004 A * 11/1995 Jachim ................... H02K 7/065
                                                    310/24

(Continued)

FOREIGN PATENT DOCUMENTS

| JP | H08-168279 A | 6/1996 |
|---|---|---|
| JP | 2002-054555 A | 2/2002 |

(Continued)

*Primary Examiner* — C Gon
(74) *Attorney, Agent, or Firm* — Oliff PLC

(57) ABSTRACT

A rotary power generating apparatus has the first, second piston magnet members, the crankshaft, the first, second guide members and the first, second fixed magnet members and the first, second demagnetizing belts. The first, second piston magnet members and the first, second fixed magnet members are arranged so that the top pole surfaces and fixed pole surfaces having equal polarity, oppose each other. The first, second demagnetizing belts have demagnetizing magnet parts, having magnetic forces weaker than that of the magnetic poles of the top pole surfaces and different from the polarity of the top pole surfaces, and non-magnetic force parts.

9 Claims, 32 Drawing Sheets

(51) Int. Cl.
    *H02K 1/17*       (2006.01)
    *H02K 1/34*       (2006.01)

(56)         References Cited

U.S. PATENT DOCUMENTS

| | | | |
|---|---|---|---|
| 7,659,680 B1* | 2/2010 | McVickers | B60T 1/10 |
| | | | 310/179 |
| 8,011,903 B2* | 9/2011 | Pollack | F04B 17/044 |
| | | | 310/15 |
| 2002/0088424 A1* | 7/2002 | Sayama | B60K 6/24 |
| | | | 123/192.2 |
| 2003/0051679 A1* | 3/2003 | Iwata | B60K 6/24 |
| | | | 123/41.31 |
| 2010/0071636 A1* | 3/2010 | Elmaleh | F02B 63/04 |
| | | | 123/2 |
| 2011/0175463 A1* | 7/2011 | Ketchersid, Jr. | H02K 7/075 |
| | | | 310/15 |
| 2014/0117786 A1* | 5/2014 | Gosvener | H02K 33/16 |
| | | | 310/23 |
| 2014/0203670 A1* | 7/2014 | Wu | H02K 33/10 |
| | | | 310/20 |
| 2014/0333166 A1* | 11/2014 | Gardner | H02K 49/104 |
| | | | 310/103 |
| 2015/0091479 A1* | 4/2015 | Spivak | B60L 11/12 |
| | | | 318/139 |
| 2016/0311303 A1* | 10/2016 | Von Schuttenbach | |
| | | | F02B 63/04 |

FOREIGN PATENT DOCUMENTS

| | | |
|---|---|---|
| JP | 2011-043157 A | 3/2011 |
| JP | 3180748 U | 1/2013 |

\* cited by examiner

Fig.4
(a)
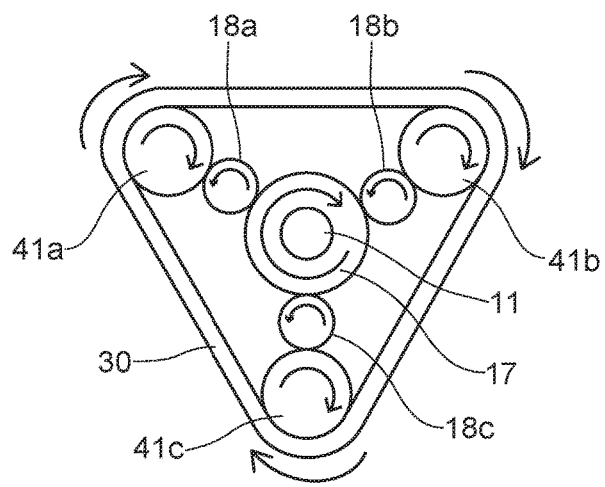
(b)
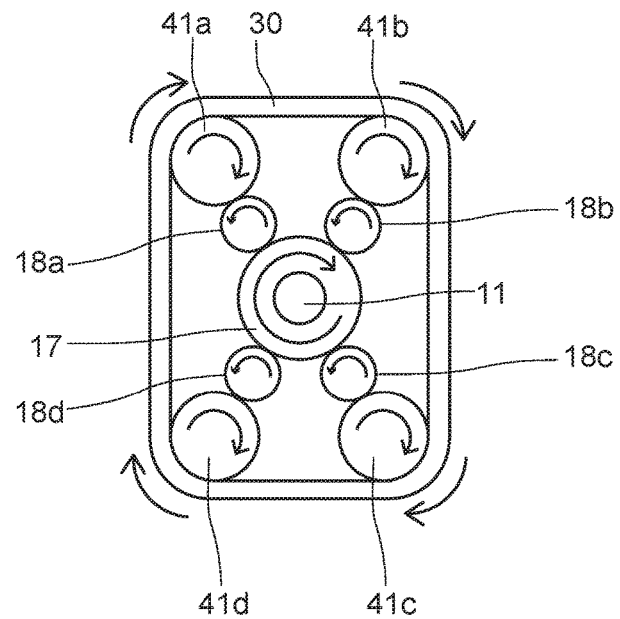

Fig.5 (a)
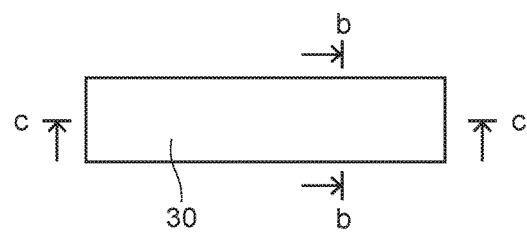
(b)
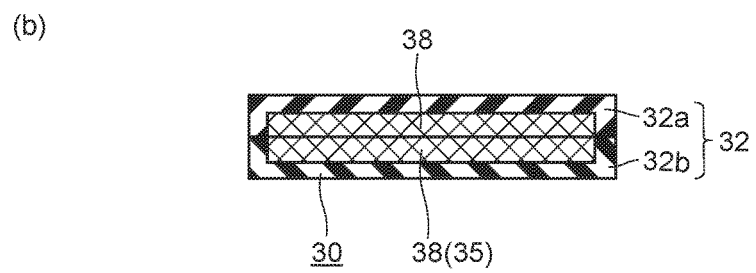
(c)
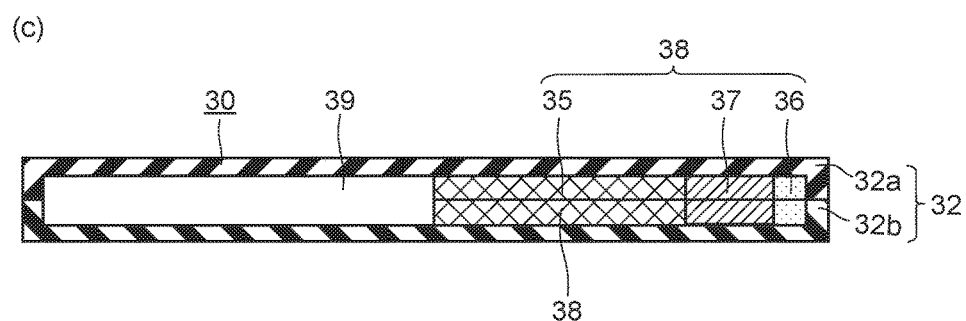
(d)
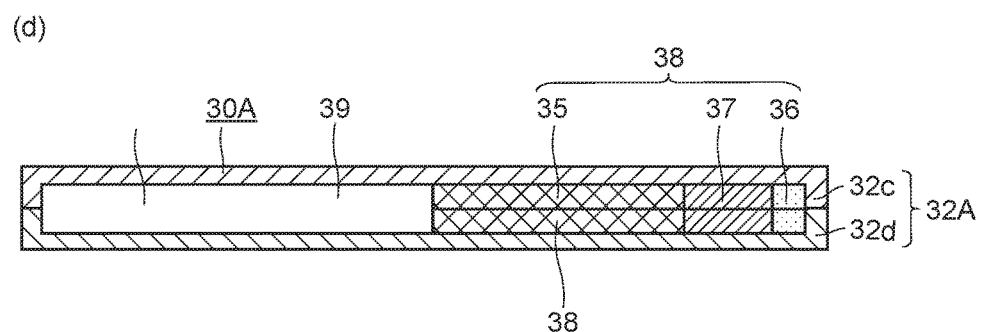

Fig.7
(a)
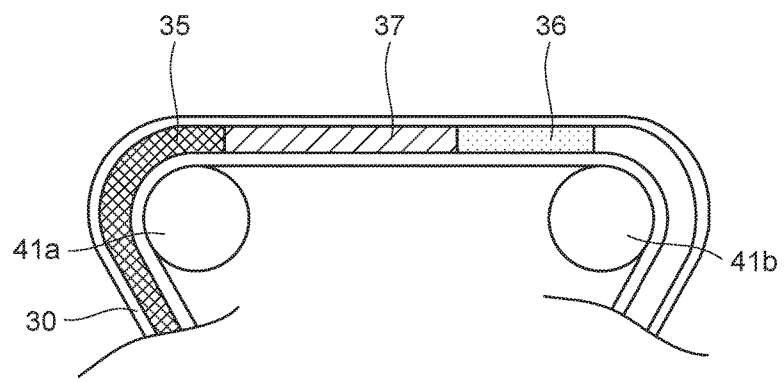
(b)
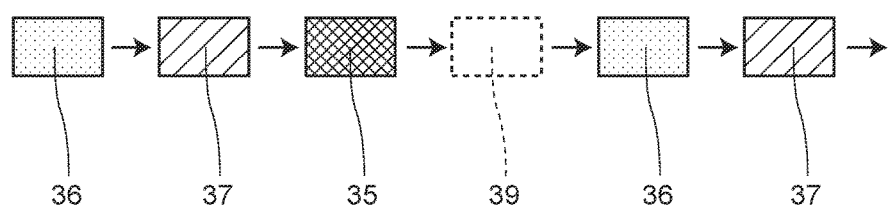

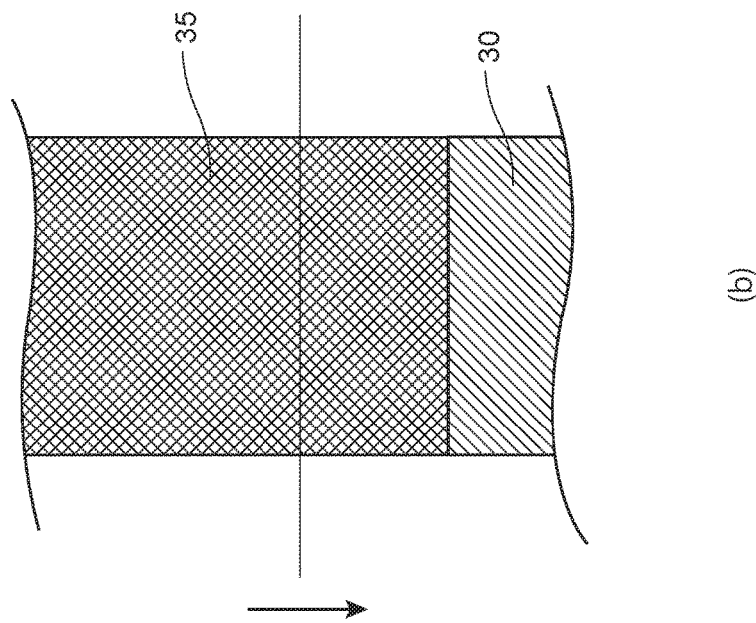
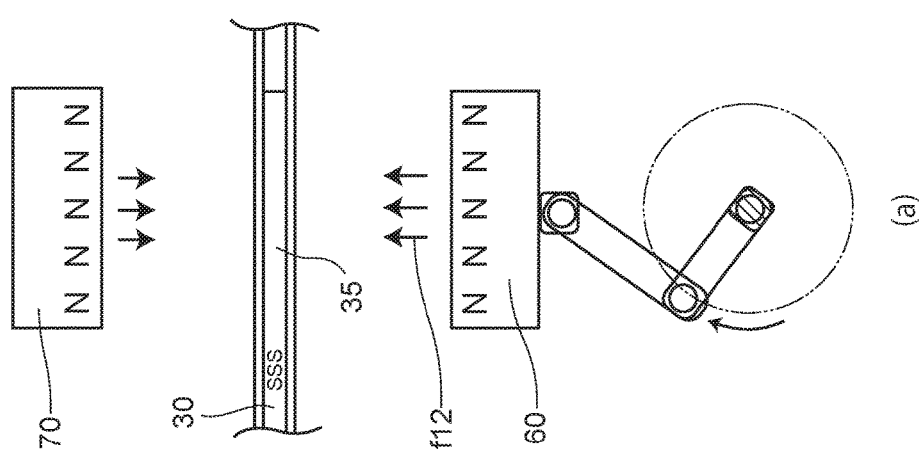
Fig. 12

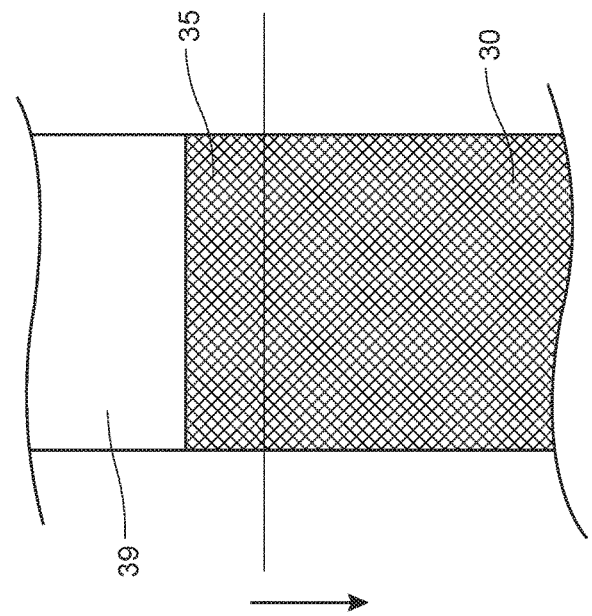
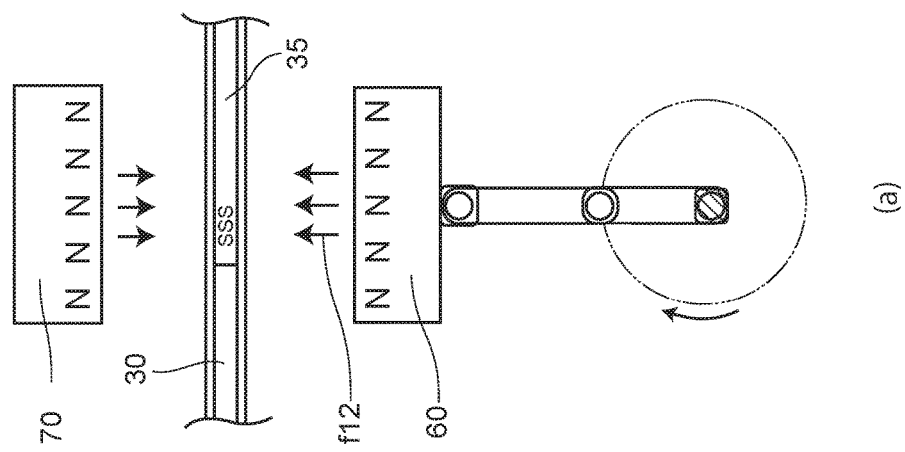

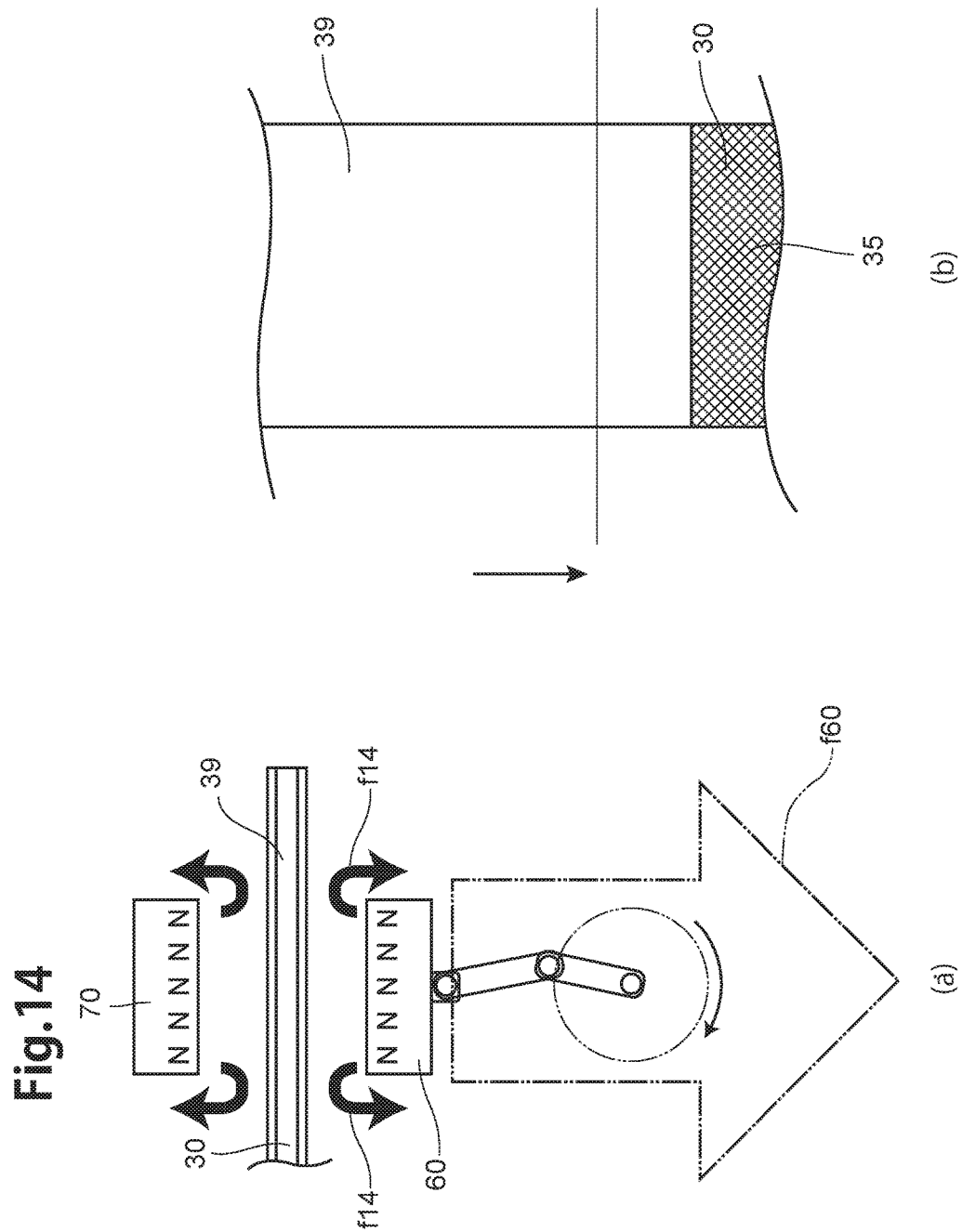

Fig.15
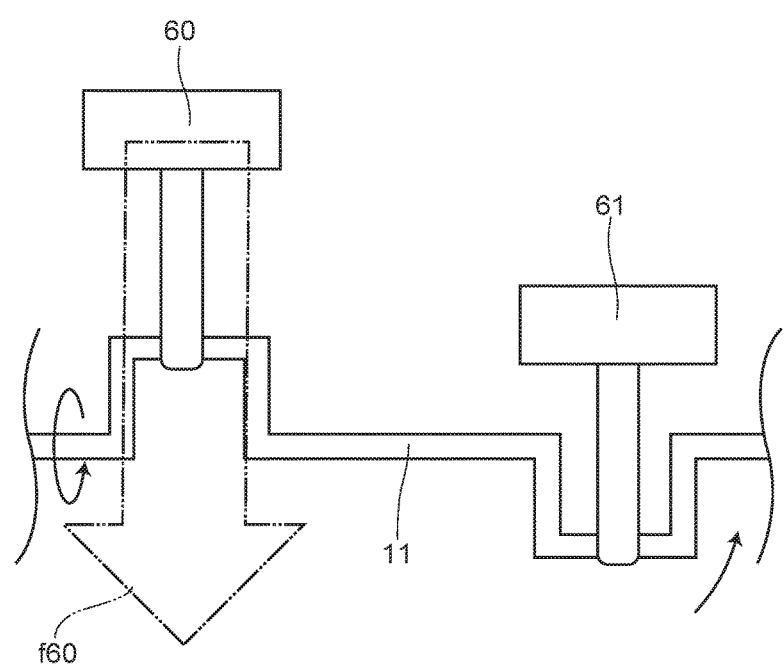
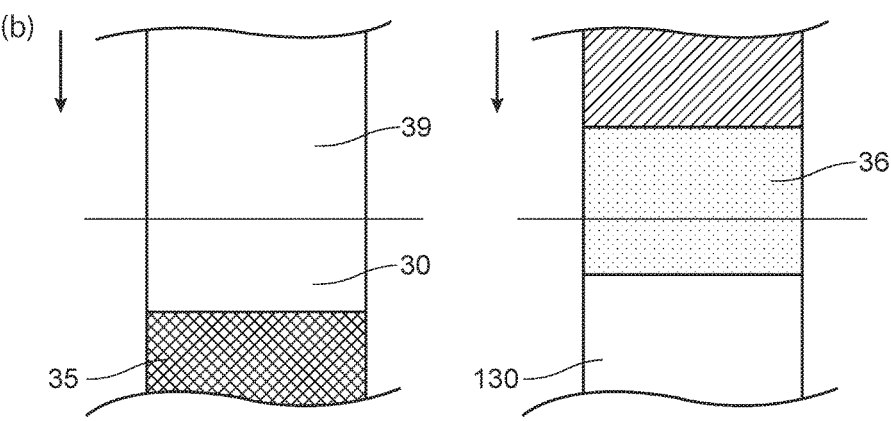

Fig.16
(a)
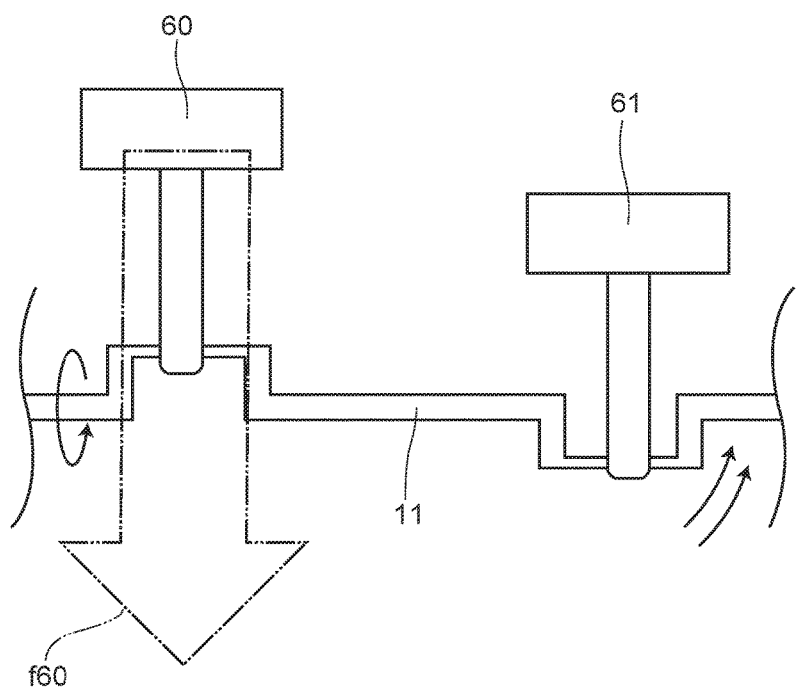
(b)
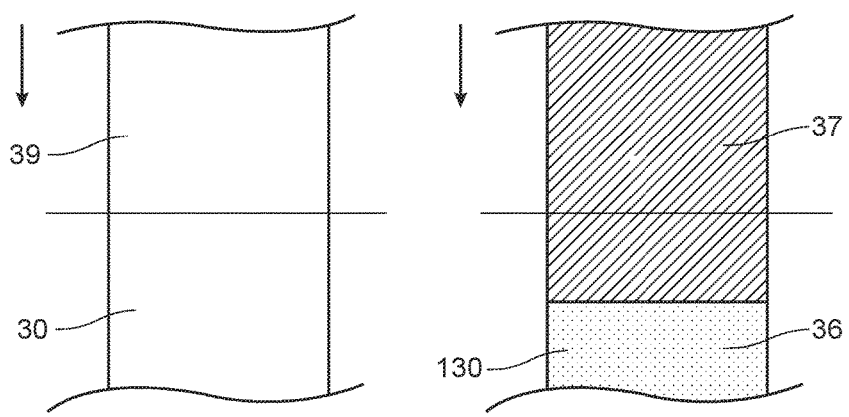

Fig.17
(a)
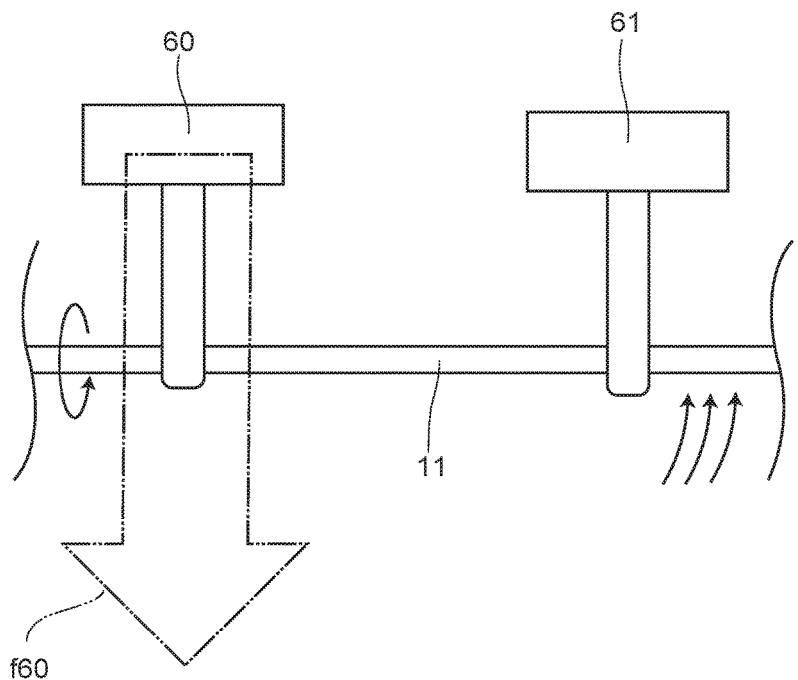
f60
(b)
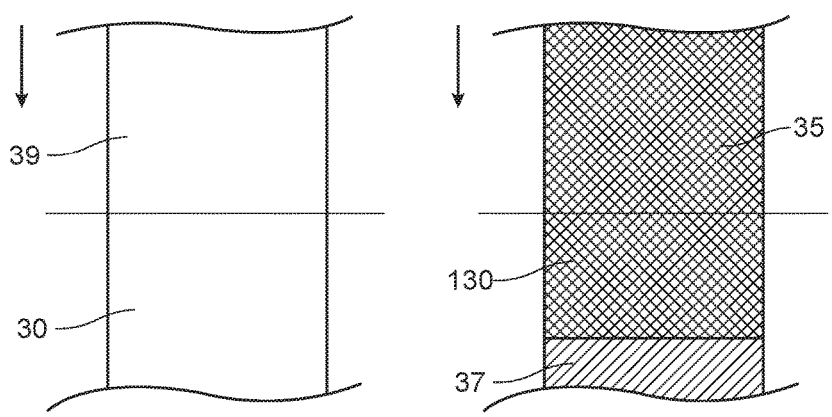

Fig.18
(a)
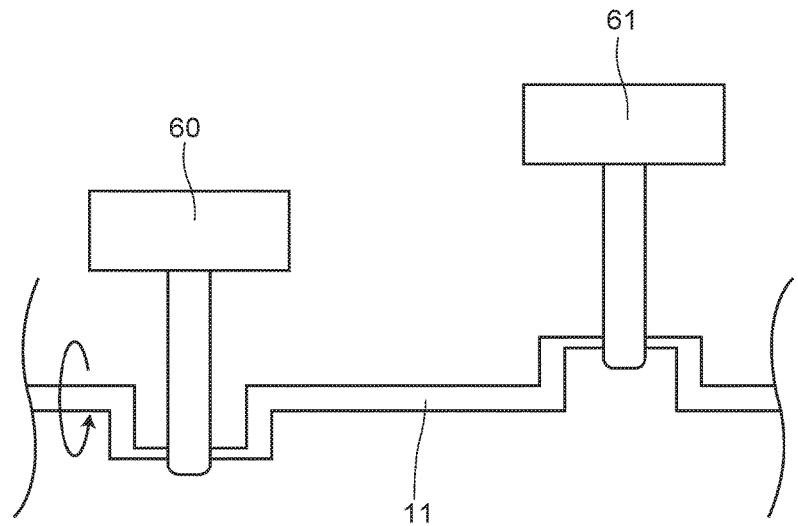
(b)
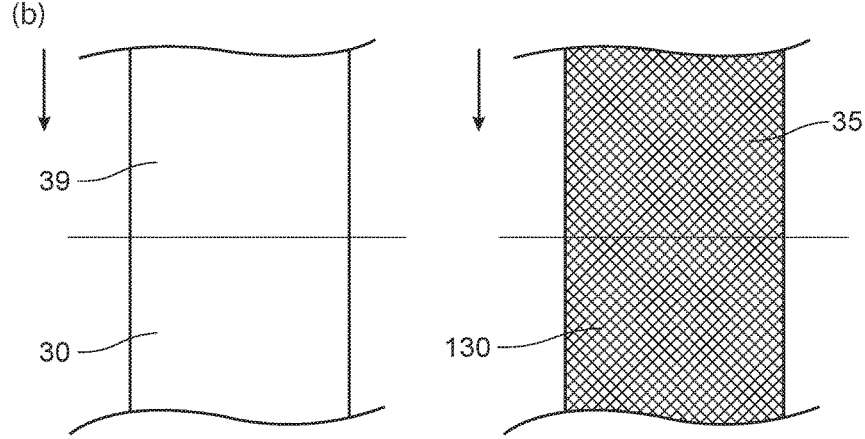

Fig.19
(a)
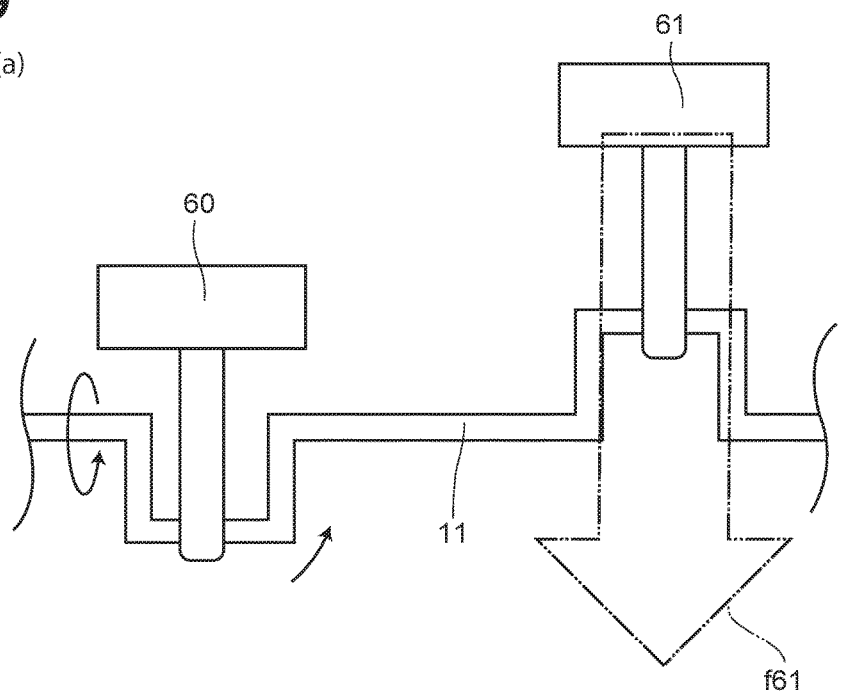
(b)
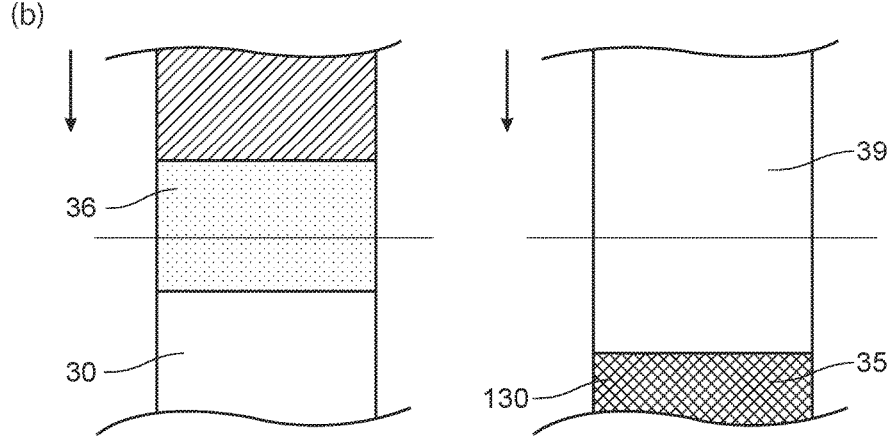

Fig.20
(a)
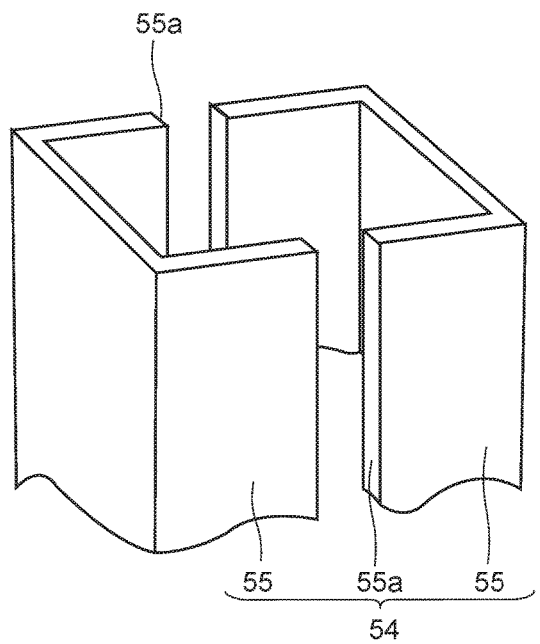
(b)
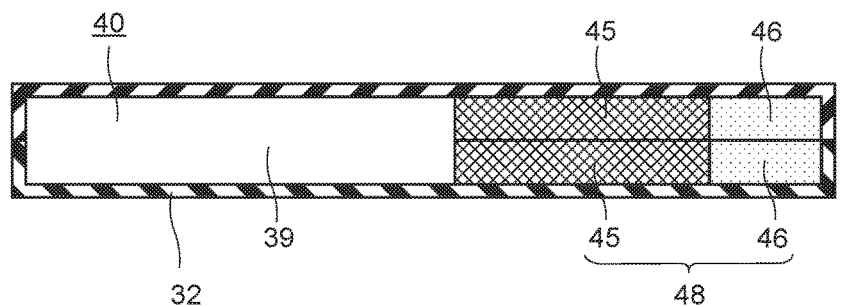

Fig.29 (PRIOR ART)
(a)
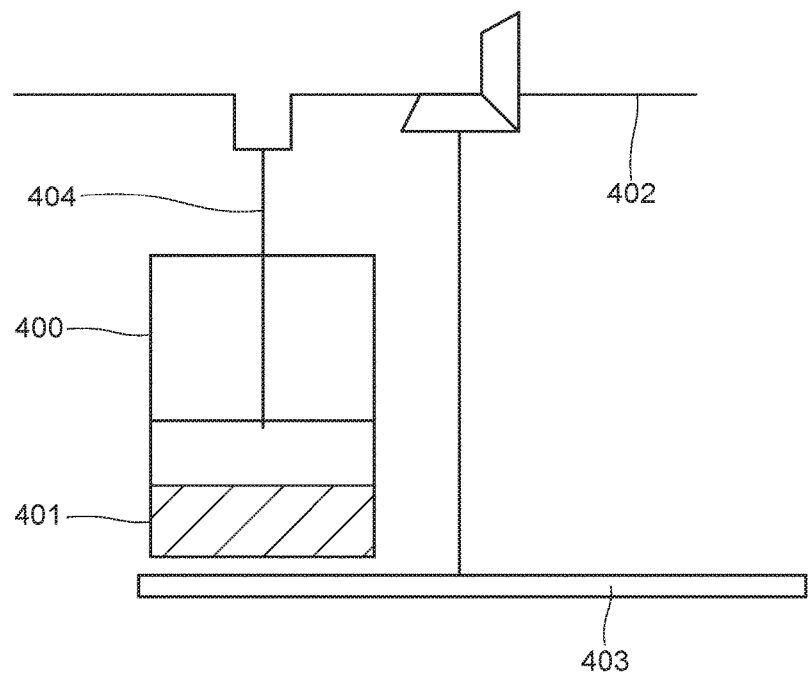
(b)
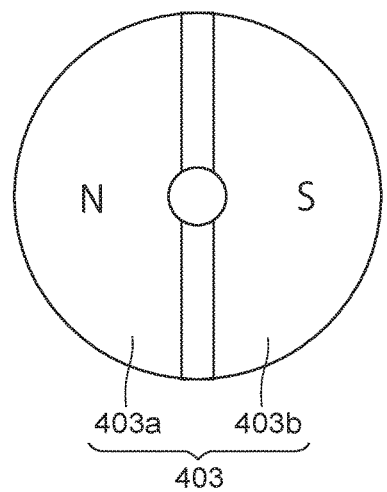

ROTARY POWER GENERATING APPARATUS AND ELECTRIC GENERATING APPARATUS

TECHNICAL FIELD

The present invention relates to a rotary power generating apparatus which generates rotary power utilizing repulsive force of a permanent magnet and an electric generating apparatus which generates electric power with the rotary power.

BACKGROUND ART

Permanent magnets have property which repulse each other with approach of the same magnetic poles and attract each other with the approach of the different magnetic poles. Formerly, an idea, which a linear motion of a member is generated by utilizing a force which permanent magnets repulse each other (repulsive force) or a force which permanent magnets attract each other (attractive force), and try to convert the linear motion to a rotary motion of another member, is known.

For example, as illustrated in FIG. 28, a magnetic force movement apparatus, having a structure which a piston magnet 301, fixed magnets 302, a connecting rod 303, a crankshaft 304 and coil springs 305 are accommodated in a cylinder 300, is disclosed in patent document 1. The piston magnet 301 and the crankshaft 304 are connected with both sides of the connecting rod 303 respectively, and fixed magnets 302, 302 are accommodated in both sides of top dead center and bottom dead center so as to repulse with the piston magnet 301 each other, and coil springs 305, 305 are accommodated outside of them, in the magnetic force movement apparatus.

Further, as illustrated in FIG. 29(a), a magnetic force applied power unit, having a structure which a piston magnet 401 is accommodated in a cylinder 400, and a crankshaft 402 is arranged outside the cylinder 400, a rotating circular shaped magnet 403 is arranged on the opposite side, is disclosed in patent document 2. In this magnetic force applied power unit, the piston magnet 401 is connected to the crankshaft 402 via a connecting rod 404, and the crankshaft 402 is connected to the circular shaped magnet 403 via a gear and shaft.

Furthermore, as illustrated in FIG. 30, a power transmitting machinery, having a structure which piston magnets 501, 501 are accommodated in cylinders 500, 500, and a crankshaft 502 is arranged outside the cylinders 500, 500, a rotary board 504 having fixed magnets 503, 503 is arranged on the opposite side, is disclosed in patent document 3. In this power transmitting machinery, the piston magnets 501, 501 are connected to the crankshaft 502 via connecting rods 505, 505, and a motor 506 is connected with the rotary board 504.

PRIOR ART DOCUMENTS

Patent Documents

Patent Document 1: JPH 8-168279

Patent Document 2: JP2011-43157

Patent Document 3: Registered Utility Model 3180748

Patent Document 4: JP2002-54555

SUMMARY OF INVENTION

Problem to be Solved by the Invention

As described above, power apparatuses, which a reciprocation of the piston magnet in the cylinder is made by utilizing the repulsive force or the attractive force of the magnet, and try to convert the reciprocation to a rotary motion of the crankshaft, are conventionally known.

By the way, the rotary motion of the crankshaft has to be continuous motion for getting effective rotary motion using these kinds of the power apparatuses. That needs repeated reciprocation of the piston magnet in the cylinder.

However, power apparatuses, disclosed in each above-described patent document, have following problems.

First, in case of the power apparatus disclosed in patent document 1, it is impossible that repulsive forces between the piston magnet 301 and the fixed magnet 302 operate in the same way from both top dead center side and bottom dead center side, because all of the piston magnet 301, the connecting rod 303 and the crankshaft 304 are accommodated in the cylinder 300. Therefore, even if the piston magnet 301 receives repulsive force by the fixed magnet 302 on the top dead center side to move to the bottom dead center side, the piston magnet 301 never return to the top dead center side with receiving similar repulsive force. Therefore, it is impossible to get continuous rotary power, because reciprocation of the piston magnet 301 is not able be obtained.

Further, in case of the power apparatus disclosed in patent document 2, the circular shaped magnet 403 is formed of a combination of the two half-circular shaped magnets 403a, 403b, as illustrated in FIG. 29 (b). However, different poles are disposed on the surface of the same side of the circular shaped magnet 403 in each half-circular shaped magnets 403a, 403b. Then, the rotation of the circular shaped magnet 403 causes operations of the alternate repulsive force and attractive force, thereby it tries to repeat going away and approach of the piston magnet 401.

However, for example, even if the repulsive force operates on the piston magnet 401 from one half-circular shaped magnet 403a, the attractive force operates on the piston magnet 401 from the other half-circular shaped magnet 403b. Therefore, both the repulsive force and attractive force operate on the piston magnet 401 at the same time. Then, when the repulsive force makes the piston magnet 401 go away from the circular shaped magnet 403, the attractive force needs to be stronger than the repulsive force for return of the piston magnet 401 to the original position, because the interval of the piston magnet 401 and the circular shaped magnet 403 extends.

However, that needs repulsive force which is able to overcome the attractive force for going away the piston magnet 401. Eventually, it is impossible to get continuous rotary power, because reciprocation of the piston magnet 401 is not able be obtained by rotation of the circular shaped magnet 403.

Further, in the power transmitting machinery disclosed in patent document 3, the magnets 503, 503 fixed on the rotary board 504 approach to the piston magnets 501, 501 alternately to change polarity of the magnet to operate on the piston magnets 501, 501, thereby it makes the repulsive force and attractive force operate on the piston magnets 501, 501 alternately.

However, even if the power transmitting machinery, operation of the attractive force which is stronger than the repulsive force needs for return of the piston magnets 501, 501, which once gone away, to the original position. Furthermore, because when one piston magnet 501 is attracted by one magnet 503, the other magnet 503 having different polarity tries to go away the piston magnet 501, repulsive force and attractive force due to the magnets 503, 503 collide with each other. Therefore, it is difficult to get continuous reciprocation of the piston magnets 501, 501.

On the other hand, an apparatus, which tries to go away and bring near the piston magnet by repetition of insertion and pulling out of an iron plate between the piston magnet and the fixed magnet whose the same magnetic poles are opposing each other, is disclosed in Patent Document 4.

However, pulling out of the iron plate become to be difficult, because the iron plate is attracted from both the piston magnet and the fixed magnet, when the iron plate is inserted between the piston magnet and the fixed magnet. Further, even if the iron plate is inserted between the piston magnet and the fixed magnet, the iron plate is not able to cut off magnetic force because the iron plate is ferromagnetic body substance. So, the reciprocation of the piston magnet is not able to be obtained.

Further, following problem has not been solved because the surfaces of the piston magnet and the fixed magnet which oppose each other (opposing surface) are arranged in parallel.

In general, lines of magnetic force, which appear from the permanent magnet, draw loop-shaped lines illustrated in FIG. 31. Therefore, if opposing surfaces 601a, 602a having the same magnetic pole (N-pole in FIG. 32) of the fixed magnet 601 and the piston magnet 602 are opposing in parallel, repulsive forces having the same strength operate in X direction and Y direction, as illustrated in FIG. 32. Then, because the piston magnet 602 is connected to the rotating crankshaft, when the piston magnet 602 leaves from the closest position to the fixed magnet 601, the opposing surface 602a moves so as to move an extremely little in parallel along the opposing surface 601a.

Then, when the opposing surface 601a and the opposing surface 602a approach each other with keeping parallel condition, the repulsive forces operate in the direction which they try to go away both the fixed magnet 601 and the piston magnet 602 along the central axis direction though, the repulsive forces do not operate easily in the direction which the opposing surface 602a moves in parallel along the opposing surface 601a. Therefore, because the effective repulsive forces do not operate easily to the motion which the piston magnet 602 tries to go away from the fixed magnet 601, it is difficult to continue the reciprocation.

As described above, because the reciprocation of the piston magnet is not able to be obtained from the above-described conventional power apparatuses, there is a problem which continuous rotary power is not able to be obtained.

The present invention is made to solve the above problems, and it is an object to provide a rotary power generating apparatus which the reciprocation of the piston magnet is able to be obtained surely and the continuity of the reciprocation is able to be enhanced, thereby the continuous rotary power is able to be obtained, and the electric generating apparatus which generates electric power with the rotary power.

Means for Solving the Problem

To solve the above problem, the present invention is a rotary power generating apparatus including: a first piston magnet member and a second piston magnet member arranged so that their polarities of magnetic poles of a top dead center side are equal; a first connecting rod and a second connecting rod connected with the bottom dead center side of the respective first, second piston magnet members; a crankshaft connected with the first, second connecting rods; a first guide member and a second guide member, which hold respectively the first, second piston magnet members from outside and guide the respective first, second piston magnet members during all process of reciprocation; a first fixed magnet member and a second fixed magnet member fixed on the positions to keep a constant interval from top pole surfaces of the top dead center side of the first, second piston magnet members, and in which fixed pole surfaces, having the same polarity with the magnetic pole of the top pole surfaces, are arranged so as to oppose the top pole surfaces of the respective first, second piston magnet members; a first demagnetizing band like member passing through between the top pole surface of the first piston magnet member and the fixed pole surface of the first fixed magnet member, and rotating with the crankshaft; and a second demagnetizing band like member passing through between the top pole surface of the second piston magnet member and the fixed pole surface of the second fixed magnet member, and rotating with the crankshaft, the first demagnetizing band like member is a member which a transformable band like member, opposing to the top pole surface of the first piston magnet member, is formed circularly, the second demagnetizing band like member is a member which a transformable band like member, opposing to the top pole surface of the second piston magnet member, is formed circularly, the first, second demagnetizing band like members includes demagnetizing magnet parts having magnetic force, weaker than the magnetic poles of the first, second piston magnet members, having different polarity from the top pole surfaces, and non-magnetic force parts, having no magnetic force, formed adjacent to the demagnetizing magnet parts; the rotary power generating apparatus including: a repulsive force unequal structure which a hindmost interval, arranged hindmost position along a rotating direction which the crankshaft rotates, is spread than an interval of another part to weaken a repulsive force repulsing the top pole surfaces and the fixed pole surfaces in the hindmost position than the repulsive force in another part, in the top pole surfaces of the respective first, second piston magnet members and the fixed pole surfaces of the first, second fixed magnet members; the rotary power generating apparatus further including: an auxiliary motor supplying power to the crankshaft so that reciprocation of the first, second piston magnet members become continuous.

In case of the above-described rotary power generating apparatus, it is preferable that the demagnetizing magnet parts of the first, second demagnetizing band like members includes strong demagnetizing parts having a strongest magnetic force, a weak demagnetizing part having a weakest magnetic force, a middle demagnetizing part having magnetic force in the middle of the strong demagnetizing parts and the weak demagnetizing parts, and a magnetic force changing structure which the strong demagnetizing parts, middle demagnetizing parts and weak demagnetizing parts are arranged sequentially along the respective rotating direction of the first, second demagnetizing band like members so that the magnetic force changes to become strong gradually along the peripheral direction.

Further, it is possible that the rotary power generating apparatus further including: a plurality of auxiliary shafts arranged along with the crankshaft and rotating with the crankshaft; and a power transmitting member transmitting a power of the crankshaft to the plurality of auxiliary shafts, the first, second demagnetizing band like members are engaged with the plurality of auxiliary shafts, and rotate with the plurality of auxiliary shafts.

Further, it is preferable that the crankshaft and the first, second connecting rods are formed so that the first, second piston magnet members reach the top dead center alternately, the first, second piston magnet members are arranged so that the one top pole surface faces the same direction with the other top pole surface, based on the crankshaft, the first, second demagnetizing band like members are engaged with the plurality of auxiliary shafts so that the second piston magnet member reaches the bottom dead center at the moment when the first piston magnet member reaches the top dead center, and immediately after that a part between the first piston magnet member and the first fixed magnet member, in the first demagnetizing band like member, changes from the demagnetizing magnet parts to the non-magnetic force parts, and the demagnetizing magnet part of the second demagnetizing band like member is arranged between the second piston magnet member and the second fixed magnet member.

Furthermore, it is preferable that the crankshaft and the first, second connecting rods are formed so that the first piston magnet member reaches the top dead center at the same timing with the second piston magnet member, the first, second piston magnet members are arranged so that one top pole surface faces the contrary direction with the other top pole surface, based on the crankshaft, the first, second demagnetizing band like members are engaged with the plurality of auxiliary shafts so that the second piston magnet member reaches the top dead center at the moment when the first piston magnet member reaches the top dead center, and immediately after that a part between the first piston magnet member and the first fixed magnet member, in the first demagnetizing band like member, changes from the demagnetizing magnet parts to the non-magnetic force parts, and a part between the second piston magnet member and the second fixed magnet member, in the second demagnetizing band like member, changes from the demagnetizing magnet parts to the non-magnetic force parts.

Further, in case of the above-described rotary power generating apparatus, it is preferable that the crankshaft and the first, second connecting rods are formed so that the first, second piston magnet members reach the top dead center alternately, the first, second piston magnet members are arranged so that one top pole surface faces the contrary direction with the other top pole surface, based on the crankshaft, the first, second demagnetizing band like members are engaged with the plurality of auxiliary shafts so that the second piston magnet member reaches the bottom dead center at the moment when the first piston magnet member reaches the top dead center, and immediately after that a part between the first piston magnet member and the first fixed magnet member, in the first demagnetizing band like member, changes from the demagnetizing magnet parts to the non-magnetic force parts, and the demagnetizing magnet part of the second demagnetizing band like member is arranged between the second piston magnet member and the second fixed magnet member.

Further, in case of the above-described rotary power generating apparatus, it is possible that the rotary power generating apparatus including: a first, second engine parts respectively having the first, second guide members, the first, second piston magnet members, the first, second fixed magnet members, the first, second connecting rods, the first, second demagnetizing band like members and the crankshaft, the crankshaft of the first engine part and the crankshaft of the second engine part are constituted with a common crankshaft being common with the first engine part and the second engine part.

Further, in case of the above-described rotary power generating apparatus, it is possible that the first demagnetizing band like member and second demagnetizing band like member are constituted with a common demagnetizing band like member being common with the first, second piston magnet members, the common demagnetizing band like member is formed to pass through between the top pole surface of the first piston magnet member and the fixed pole surface of the first fixed magnet member, and pass through between the top pole surface of the second piston magnet member and the fixed pole surface of the second fixed magnet member.

Further, the present invention provides an electric generating apparatus including: a rotary power generating apparatus; and a generator, which generates an electric power with a rotary power generated by the rotary power generating apparatus, the rotary power generating apparatus including: a first piston magnet member and a second piston magnet member arranged so that their polarities of magnetic poles of a top dead center side are equal; a first connecting rod and a second connecting rod connected with the bottom dead center side of the respective first, second piston magnet members; a crankshaft connected with the first, second connecting rods; a first guide member and a second guide member, which hold respectively the first, second piston magnet members from outside and guide the respective first, second piston magnet members during all process of reciprocation; a first fixed magnet member and a second fixed magnet member fixed on the positions to keep a constant interval from top pole surfaces of the top dead center side of the first, second piston magnet members, and in which fixed pole surfaces, having the same polarity with the magnetic pole of the top pole surfaces, are arranged so as to oppose the top pole surfaces of the respective first, second piston magnet members; a first demagnetizing band like member passing through between the top pole surface of the first piston magnet member and the fixed pole surface of the first fixed magnet member, and rotating with the crankshaft; and a second demagnetizing band like member passing through between the top pole surface of the second piston magnet member and the fixed pole surface of the second fixed magnet member, and rotating with the crankshaft, the first demagnetizing band like member is a member which a transformable band like member, opposing to the top pole surface of the first piston magnet member, is formed circularly, the second demagnetizing band like member is a member which a transformable band like member, opposing to the top pole surface of the second piston magnet member, is formed circularly, the first, second demagnetizing band like members includes demagnetizing magnet parts having magnetic force, weaker than the magnetic poles of the first, second piston magnet members, having different polarity from the top pole surfaces, and non-magnetic force parts, having no magnetic force, formed adjacent to the demagnetizing magnet parts; the rotary power generating apparatus including: a repulsive force unequal structure which a hindmost interval, arranged hindmost position along a rotating direction which the crankshaft rotates, is spread than an interval of another part to weaken a repulsive force repulsing the top pole surfaces and the fixed pole surfaces in the hindmost position than the repulsive force in another part, in the top pole surfaces of the respective first, second piston magnet members and the fixed pole surfaces of the first, second fixed magnet members; the rotary power generating apparatus further including: an auxiliary motor supplying power to the crankshaft so that reciprocation of the first, second piston magnet members become continuous.

Effect of the Invention

As described above, the present invention provides the rotary power generating apparatus which the reciprocation of the piston magnet is able to be obtained surely and the continuity is able to be enhanced, and thereby continuous rotary power is able to be obtained, and the present invention provides the electric generating apparatus which generates electric power with the rotary power.

BRIEF DESCRIPTION OF DRAWINGS

FIG. 4 (a) is a side elevation view illustrating three auxiliary shafts and auxiliary gears with a crankshaft and a first demagnetizing belt, FIG. 4 (b) is a side elevation view illustrating four auxiliary shafts and the auxiliary gears with the crankshaft and the first demagnetizing belt;

FIG. 5 (a) is a development view illustrating the first demagnetizing belt, FIG. 5 (b) is a sectional view taken along the line b-b in FIG. 5 (a), FIG. 5 (c) is a sectional view taken along the line c-c in FIG. 5 (a), FIG. 5 (d) is the same sectional view of another first demagnetizing belt with FIG. 5 (c);

FIG. 7 (a) is a side elevation view illustrating the principal parts of the first demagnetizing belt and the auxiliary shafts, FIG. 7 (b) is a view illustrating a changing pattern of a demagnetizing magnet part and non-magnetic force part in the first demagnetizing belt;

FIG. 12 (a) is a view schematically illustrating the first piston magnet member, the first fixed magnet member and the first demagnetizing belt subsequent to those in FIG. 11 (a), FIG. 12 (b) is a view schematically illustrating a principal part of the first demagnetizing belt subsequent to that in FIG. 11 (b);

FIG. 13 (a) is a view schematically illustrating the first piston magnet member, the first fixed magnet member and the first demagnetizing belt subsequent to those in FIG. 12 (a), FIG. 13 (b) is a view schematically illustrating a principal part of the first demagnetizing belt subsequent to that in FIG. 12 (b);

FIG. 14 (a) is a view schematically illustrating the first piston magnet member, the first fixed magnet member and the first demagnetizing belt subsequent to those in FIG. 13 (a), FIG. 14 (b) is a view schematically illustrating a principal part of the first demagnetizing belt subsequent to that in FIG. 13 (b);

FIG. 15 (a) is a view schematically illustrating the first, second piston magnet members and the crankshaft, immediately after the first, second piston magnet members reached the top dead center, bottom dead center respectively, FIG. 15 (b) is a view schematically illustrating the first, second demagnetizing belts at that time;

FIG. 16 (a) is a view schematically illustrating the first, second piston magnet members and the crankshaft subsequent to those in FIG. 15 (a), FIG. 16 (b) is a view schematically illustrating the first, second demagnetizing belts subsequent to that in FIG. 15 (b);

FIG. 17 (a) is a view schematically illustrating the first, second piston magnet members and the crankshaft subsequent to those in FIG. 16 (a), FIG. 17 (b) is a view schematically illustrating the first, second demagnetizing belts subsequent to that in FIG. 16 (b);

FIG. 18 (a) is a view schematically illustrating the first, second piston magnet members and the crankshaft subsequent to those in FIG. 17 (a), FIG. 18 (b) is a view schematically illustrating the first, second demagnetizing belts subsequent to that in FIG. 17 (b);

FIG. 19 (a) is a view schematically illustrating the first, second piston magnet members and the crankshaft subsequent to those in FIG. 18 (a), FIG. 19 (b) is a view schematically illustrating the first, second demagnetizing belts subsequent to that in FIG. 18 (b);

FIG. 20 (a) is a perspective view illustrating a guide member according to a modified example with a part thereof omitted, FIG. 20 (b) is a sectional view of the demagnetizing belt according to a modified example;

FIG. 29 (a) is a view illustrating the conventional magnetic force applied power unit, FIG. 29 (b) is a view illustrating the circular shaped magnet;

DESCRIPTION OF EMBODIMENTS

In the following, embodiments of the present invention will be described with reference to the drawings. Note that the same components will be referred to with the same numerals or letters, while omitting their overlapping descriptions.

First Embodiment (Structure of Rotary Power Generating Apparatus)

To begin with, the structure of the rotary power generating apparatus according to the first embodiment of the present invention will be explained with reference to FIG. 1 to FIG. 9.

Figure 1:
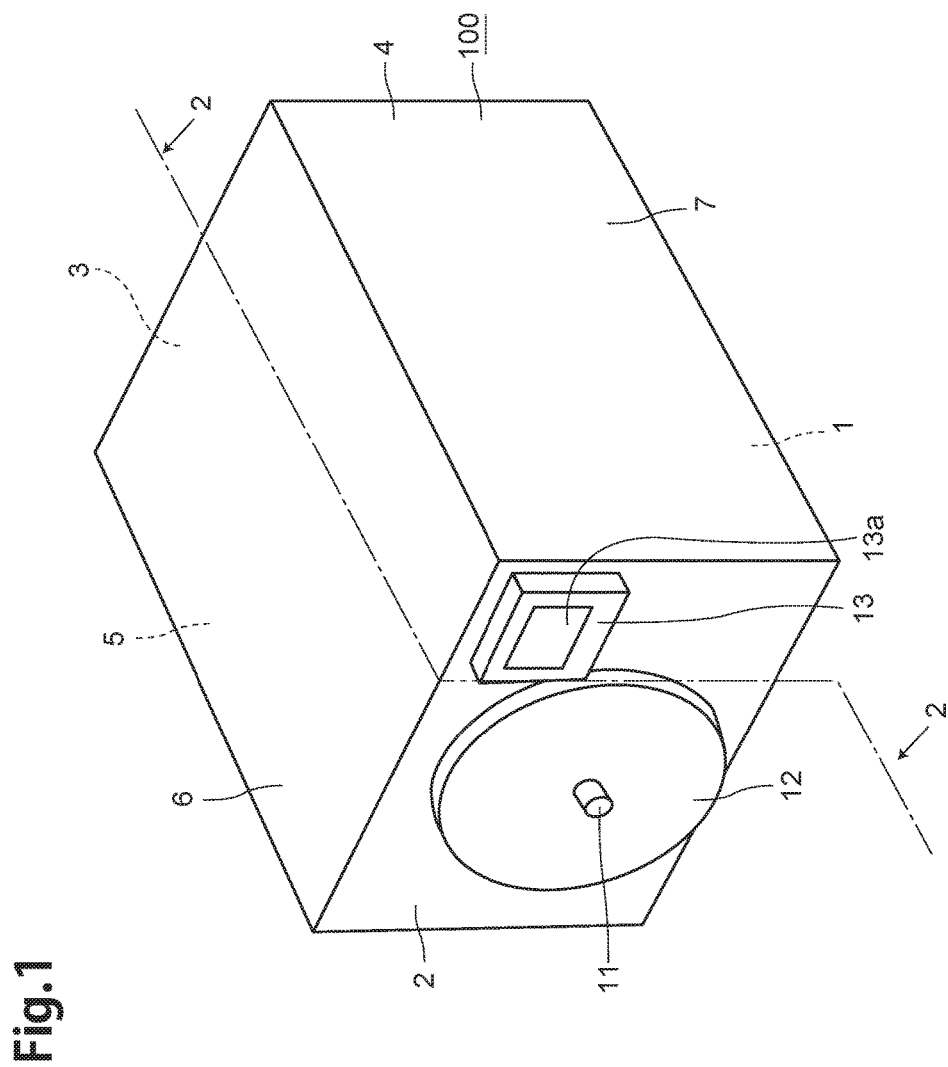
FIG. 1 is a perspective view illustrating the rotary power generating apparatus according to a first embodiment of the present invention.
Figure 2:
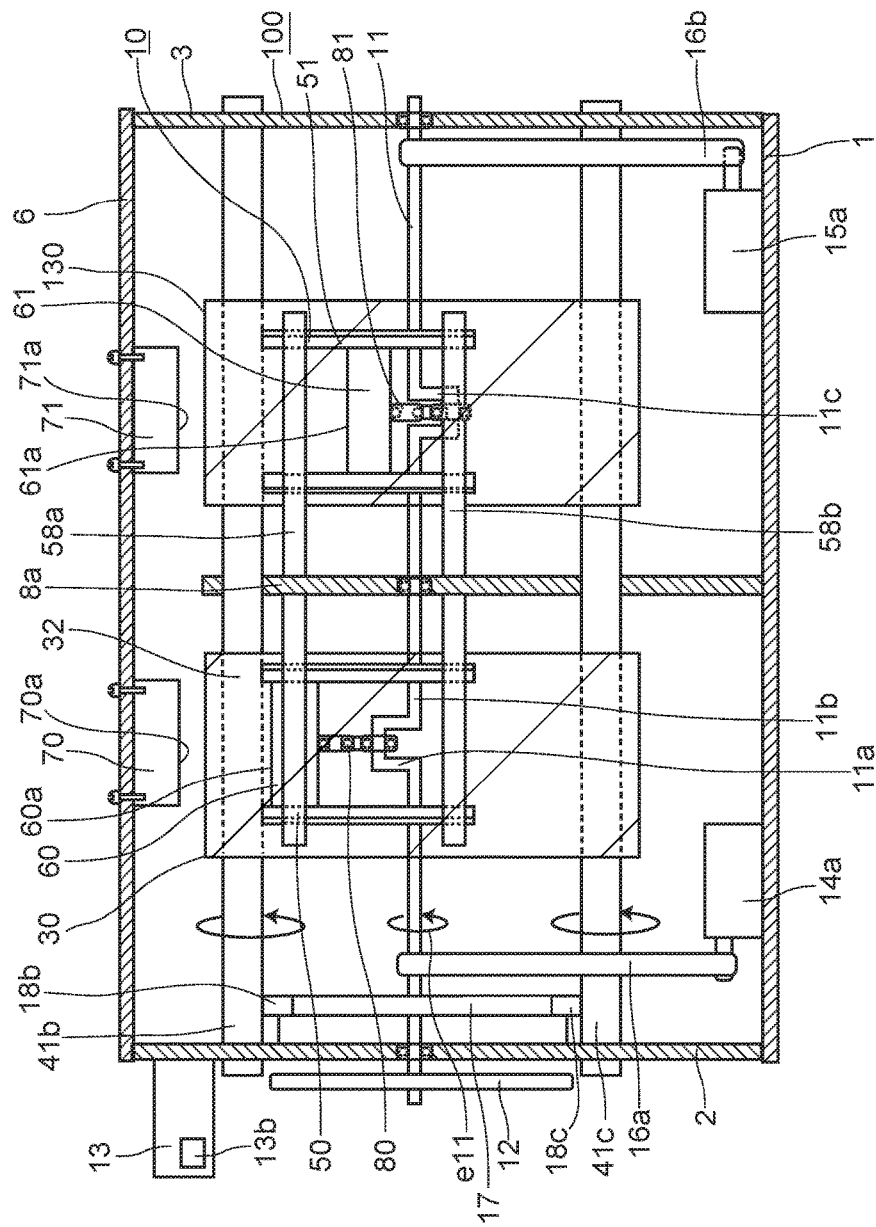
FIG. 2 is a sectional view of the rotary power generating apparatus taken along the line 2-2 in FIG. 1.
Figure 3:
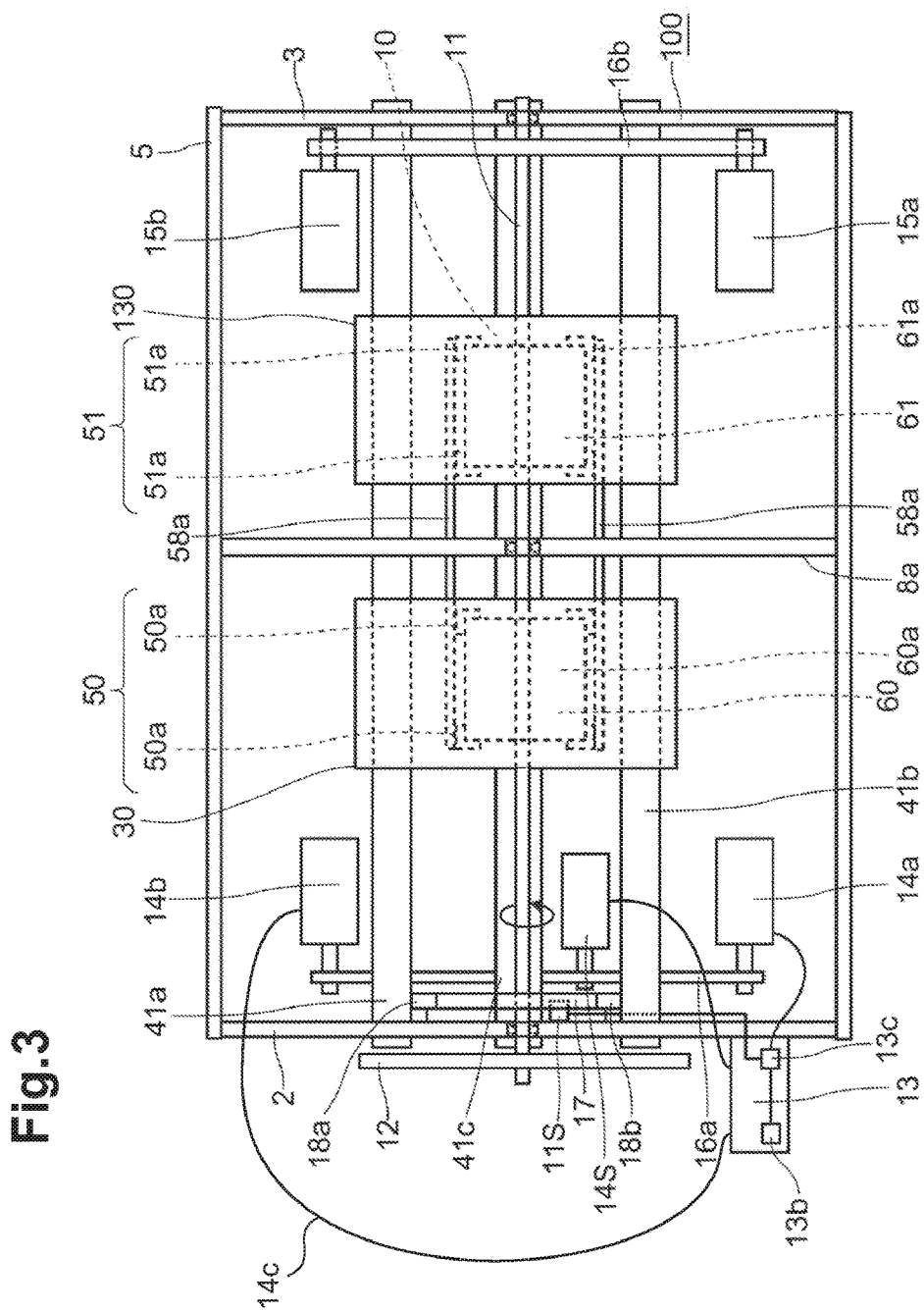
FIG. 3 is a plan view illustrating the rotary power generating apparatus which the lid part is removed.
Figure 6:
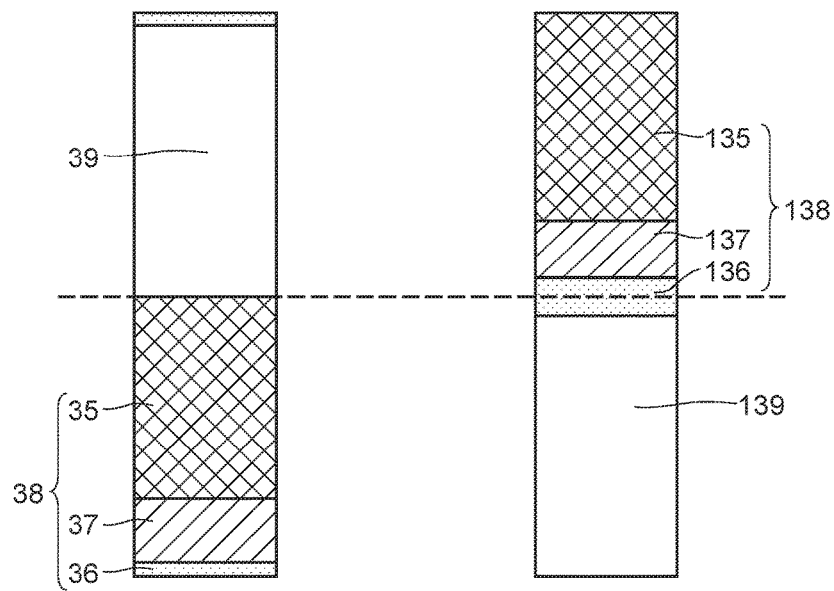
FIG. 6 is a view illustrating the principal parts of the first, second demagnetizing belts in developed state.
Figure 8:
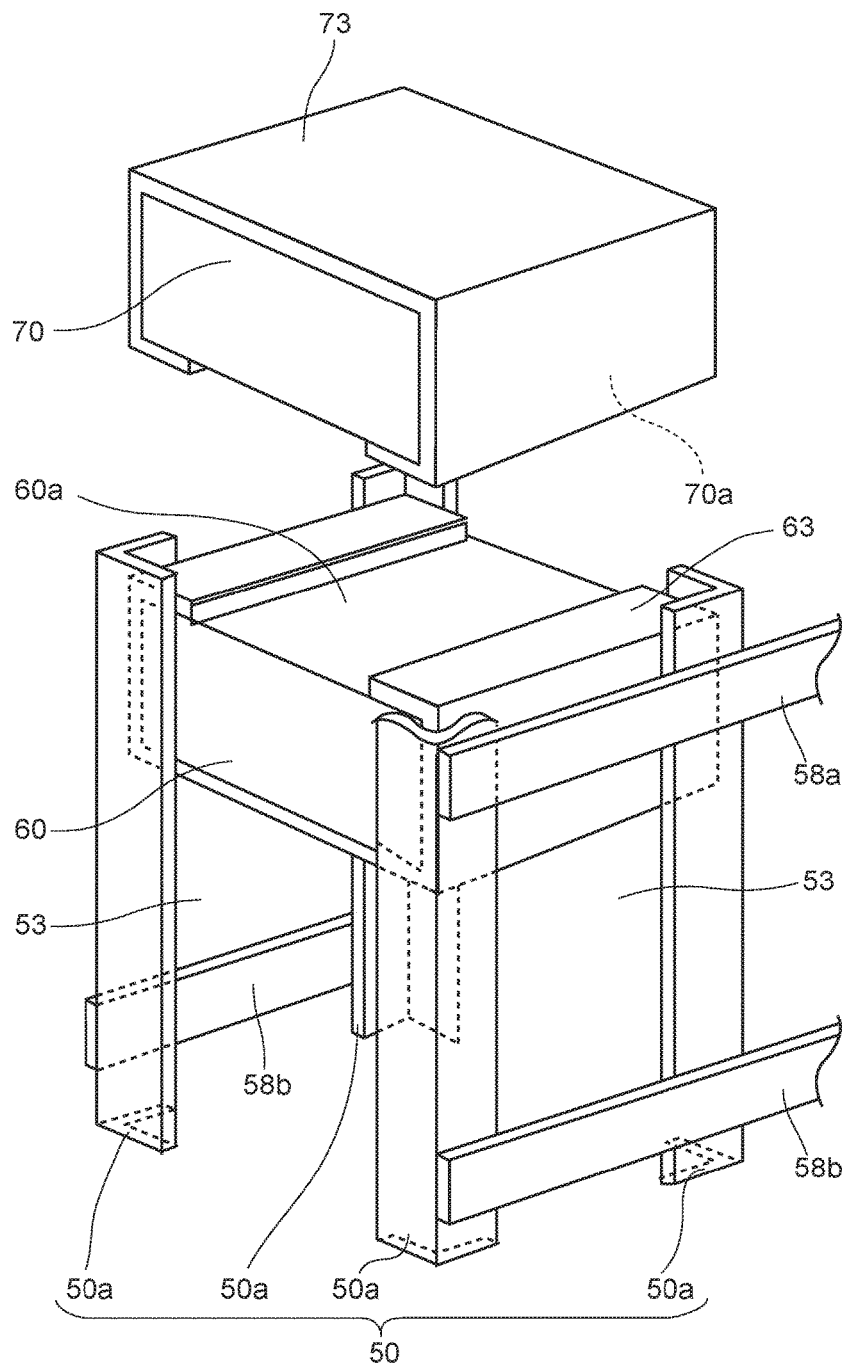
FIG. 8 is a perspective view illustrating a first guide member, a first piston magnet member and first fixed magnet member, with parts of them omitted.
Figure 9:
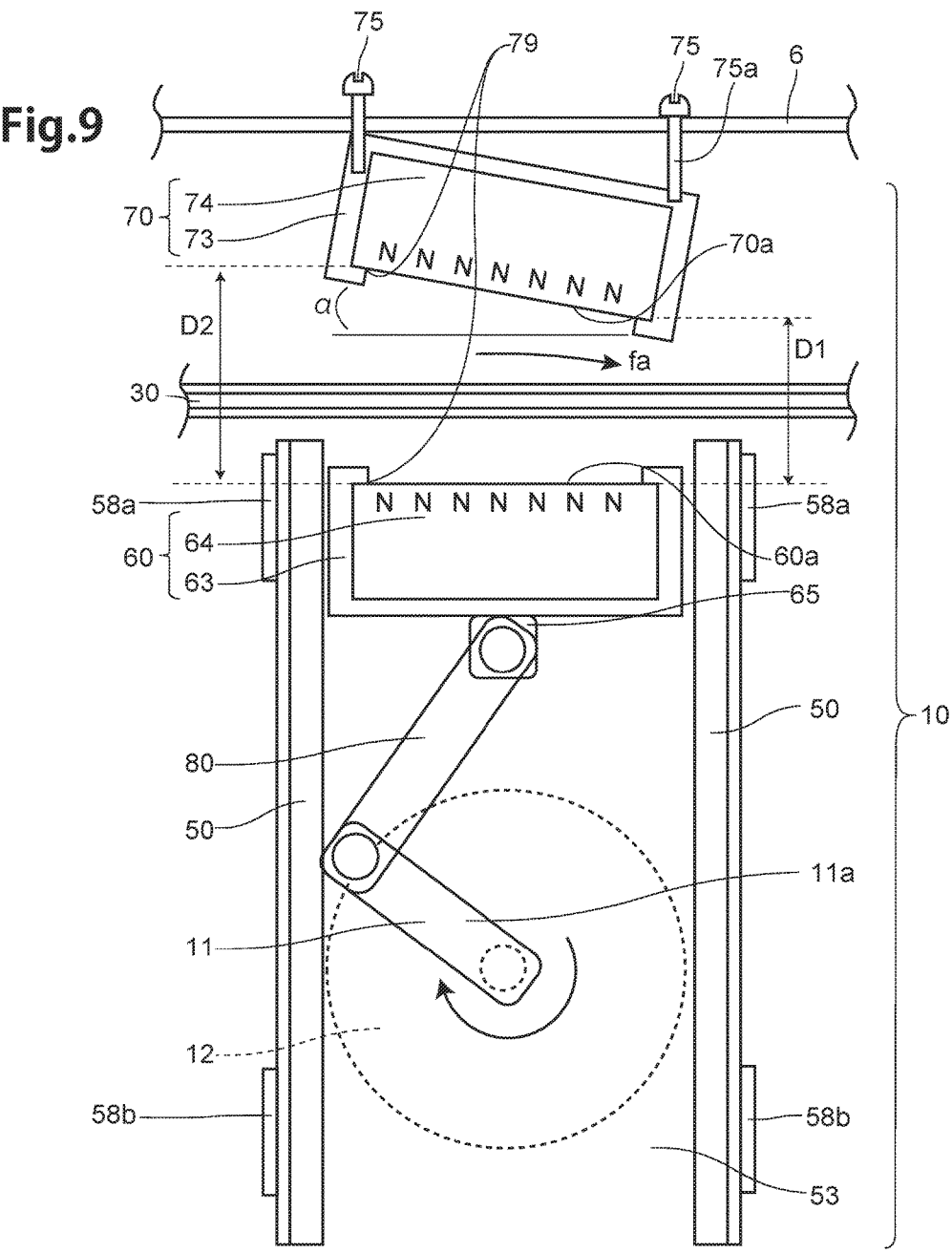
FIG. 9 is a side elevation view of an engine part of the first piston magnet member side, seen from a direction intersecting the crankshaft.

Here, FIG. 1 is a perspective view illustrating the rotary power generating apparatus 100 according to the first embodiment of the present invention, FIG. 2 is a sectional view of the rotary power generating apparatus 100 taken along the line 2-2 in FIG. 1 and FIG. 3 is a plan view illustrating the rotary power generating apparatus 100 which a lid part 6 is removed. Further, FIG. 4 (a) is a side elevation view illustrating three auxiliary shafts 41a, 41b, 41c and auxiliary gears 17, 18a, 18b, 18c with crankshaft 11 and the first demagnetizing belt 30, FIG. 4 (b) is a side elevation view illustrating four auxiliary shafts 41a, 41b, 41c, 41d and the auxiliary gears 17, 18a, 18b, 18c, 18d with the crankshaft 11 and the first demagnetizing belt 30. FIG. 5 (a) is a development view illustrating the first demagnetizing belt 30, FIG. 5 (b) is a sectional view taken along the line b-b in FIG. 5 (a), FIG. 5 (c) is a sectional view taken along the line c-c in FIG. 5 (a), FIG. 5 (d) is the same sectional view of the first demagnetizing belt 30A with FIG. 5 (c). FIG. 6 is a view illustrating the principal parts of the first, second demagnetizing belts 30, 130 in developed state. FIG. 7 (a) is a side elevation view illustrating the principal parts of the first demagnetizing belt 30 and the auxiliary shafts 41a, 41b, FIG. 7 (b) is a view illustrating a changing pattern of the demagnetizing magnet part and non-magnetic force part in the first demagnetizing belt 30. FIG. 8 is a perspective view illustrating a first guide member 50, a first piston magnet member 60 and first fixed magnet member 70, with parts of them omitted. FIG. 9 is a side elevation view of an engine part 10, of the first piston magnet member 60 side, seen from a direction intersecting the crankshaft 11.

The rotary power generating apparatus 100 has the first, second piston magnet members 60, 61, the first, second fixed magnet members 70, 71, which top pole surfaces 60a, 61a and fixed pole surfaces 70a, 71a, having magnetic poles with the same polarity, are arranged opposing each other, and has the first, second demagnetizing belts 30, 130, having magnetic forces with different polarity from the magnetic poles of the first, second piston magnet members 60, 61, which are arranged between the top pole surfaces 60a, 61a and the fixed pole surfaces 70a, 71a.

Then, in the rotary power generating apparatus 100, the first, second piston magnet members 60, 61 alternately approach to the first, second fixed magnet members 70, 71, while reducing the repulsive force of the first piston magnet member 60 and the first fixed magnet member 70 (hereinafter referred to as a "first repulsive force") and repulsive force of the second piston magnet member 61 and the second fixed magnet member 71 (hereinafter referred to as a "second repulsive force") using the first, second demagnetizing belts 30, 130.

Note that the approach, of the first, second piston magnet members 60, 61 to the first, second fixed magnet members 70, 71, is referred also as "progress", the getting away, of the first, second piston magnet members 60, 61 from the first, second fixed magnet members 70, 71, is referred also as "regress".

And, the second piston magnet members 61 is able to progress while reducing the second repulsive force during the first piston magnet member 60 regresses by the first repulsive force, after that, the first piston magnet member 60 is able to progress while reducing the first repulsive force during the second piston magnet member 61 regresses by the second repulsive force.

Because the first, second piston magnet members 60, 61 are able to repeat the above-described regress and progress alternately, in the rotary power generating apparatus 100, reciprocations of the first, second piston magnet members 60, 61 are able to be realized, and the continuity is able to be enhanced by using power of a later-described starter motor 14a.

And, the structure of the rotary power generating apparatus 100 will be explained in detail as follows.

As illustrated in FIG. 1 to FIG. 3, the rotary power generating apparatus 100 has a housing 7, having a bottom part 1, a left wall part 2, a right wall part 3, a front wall part 4, a back wall part 5 and the lid part 6. The engine part 10 is provided almost center of the housing 7. The crankshaft 11 of the engine part 10 passes through the left wall part 2, the right wall part 3 and a middle wall part 8a, and a flywheel 12 is fixed to the outside part of the crankshaft 11 than the left wall part 2. Further, a control panel 13 is fixed to outside part of the left wall part 2. The control panel 13 includes a monitor 13a, which displays an action condition of various measuring instrument, such as not-illustrated voltmeter, provided in the housing 7, a battery 13b and a not-illustrated heat vent.

Further, a rotation sensor 11S is provided on the left wall part 2, in a neighborhood of the crankshaft 11. The rotation sensor 11S is connected to a later-described timer relay 13c. The rotation sensor 11S detects the number of rotations of the crankshaft 11, and input the detected number of rotations to the timer relay 13c.

And the control panel 13 has at least the timer relay 13c as the above-described measuring instrument. The timer relay 13c is connected to the battery 13b, rotation sensor 11S and later-described starter motor 14a. An internal relay of the timer relay 13c operates regularly (for example, in every several seconds). Further, the internal relay also operates when the number of rotations of the crankshaft 11, input from the rotation sensor 11S, become smaller than the number of rotations which is set (set-up number of rotations). When the timer relay 13c operates, electric power is supplied to the later-described starter motor 14a from the battery 13b.

Further, the three auxiliary shafts 41a, 41b, 41c are arranged along the crankshaft 11. These pass through the left wall part 2 and the right wall part 3 (the auxiliary shaft 41c also passes through the middle wall part 8a), and the three auxiliary shafts 41a, 41b, 41c are arranged so as to surround the crankshaft 11. Further, the auxiliary shafts 41a, 41b, 41c are arranged so that they are the same length distant from the crankshaft 11, each interval is equal, and they form a reverse triangle (see FIG. 4). The auxiliary shafts 41a, 41b are arranged on the upper side of crankshaft 11 (the lid part 6 side), the auxiliary shafts 41c is arranged on the lower side of crankshaft 11 (the bottom part 1 side). Further, the three auxiliary shafts 41a, 41b, 41c are engaged with the later-described auxiliary gears 18a, 18b, 18c. Not-illustrated concavity and convexity, capable of being engaged with the first, second demagnetizing belts 30, 130, are formed on the middle part of the auxiliary shafts 41a, 41b, 41c along the shaft direction Further, the starter motor 14a, a DC generator (dynamo) 14b and motor generators 15a, 15b are fixed on the bottom part 1 in the housing 7. The starter motor 14a and DC generator (dynamo) 14b are connected to the crankshaft 11 with a belt 16a, motor generators 15a, 15b are connected to the crankshaft 11 with a belt 16b. The starter motor 14a is connected to the battery 13b. The DC generator (dynamo) 14b is also connected to the battery 13b (line 14c). The motor generators 15a, 15b are connected to the output code (not illustrated).

The starter motor 14a supplies rotary power to the crankshaft 11 via the belt 16a. The starter motor 14a corresponds to an auxiliary motor according to the present invention. It is preferable that an assist motor 14S is provided in addition to the starter motor 14a, as illustrated in FIG. 3. The assist motor 14S is connected to the battery 13b (not illustrated). Further, the assist motor 14S, similar with the starter motor 14a, supplies rotary power to the crankshaft 11 via the belt 16a.

The engine part 10 has the crankshaft 11, the first, second guide members 50, 51, mounting boards 58a, 58b, the first, second piston magnet members 60, 61, the first, second fixed magnet members 70, 71, the first, second connecting rods 80, 81 and the first, second demagnetizing belts 30, 130.

The crankshaft 11 has the first, second crank parts 11a, 11c and connecting part 11b which connect the first crank part 11a with the second crank part 11c. The first, second connecting rods 80, 81 are connected with the first, second crank parts 11a, 11c. Further, the crank angle of the first, second crank parts 11a, 11c is set up on 180 degrees.

The auxiliary gear 17 is fixed on the left wall part 2 side, of the crankshaft 11, more than the first crank part 11a. The auxiliary gear 17 and three auxiliary gears 18a, 18b, 18c constitute the power transmitting member according to the embodiment of the present invention. The auxiliary gear 17 is engaged with the three auxiliary gears 18a, 18b, 18c. The auxiliary gears 18a, 18b, 18c are respectively engaged with the auxiliary shafts 41a, 41b, 41c. The auxiliary gear 17 and three auxiliary gears 18a, 18b, 18c transmit the power of the crankshaft 11 to the three auxiliary shafts 41a, 41b, 41c. The auxiliary gears 18a, 18b, 18c are supported in the left wall part 2 via a bearing. Note that sizes of the auxiliary gear 17 and auxiliary gears 18a, 18b, 18c are modified for convenience of illustration, in FIG. 4.

The first guide member 50 has four holding members 50a, as illustrated in FIG. 3, FIG. 8 and so on. The holding member 50a, is an L-figure like member in sectional view, has a length that can guide the first piston magnet member 60 during all process of reciprocation. The respective holding member 50a is arranged outside the corner part of the respective first piston magnet member 60 so as to surround the first piston magnet member 60.

Further, the mounting boards 58a, 58b are fixed respectively on the upper side, lower side, of each holding member 50a, more than the crankshaft 11. The mounting boards 58a, 58b are fixed on the middle wall part 8a. Thereby each holding members 50a are hold at a position, inside the housing 7, distant from the bottom part 1.

Then, each holding member 50a is distant from another holding member 50a to form gap parts 53 in the first guide member 50. Gap parts 53 are parts that connect inside a rectangular parallel piped shaped space with outside, the space is surrounded with four holding members 50a. Gap parts 53 are formed in all range of reciprocation of the first piston magnet member 60.

The second guide member 51 has the four holding members 51a similar with the holding members 50a. The respective holding member 51a is arranged outside the corner part of the respective second piston magnet member 61 so as to surround the second piston magnet member 61. Gap parts, similar with the gap parts 53, are also formed in the second guide member 51.

Further, the mounting boards 58a, 58b are also fixed respectively on the upper side, lower side, of each holding member 51a, more than the crankshaft 11, similar with the holding members 50a. Each holding members 51a are also held at the position, inside the housing 7, distant from the bottom part 1, similar with the holding members 50a.

The first, second piston magnet members 60, 61 have size of being accommodated inside the first, second guide members 50, 51 respectively, and they are formed so as to reciprocate inside the first, second guide members 50, 51. Further, the first, second piston magnet members 60, 61 are accommodated inside the first, second guide members 50, 51 so that the respective top pole surfaces 60a, 61a face the same direction (direction that they go toward the lid part 6, in this embodiment).

The first, second piston magnet members 60, 61, have holding cases 63 and permanent magnets 64, as illustrated in FIG. 8, FIG. 9, in detail. The holding cases 63 are members, which aluminum board are bent so as to form approximately C-figure like shape in the cross section, and they have size being accommodated inside the first guide member 50 (a space surrounded by the four holding members 50a). The permanent magnets 64 are magnets having size being fitted to the holding case 63 without gap, and they have approximately rectangular parallel piped shapes. The permanent magnets 64 are magnets having an extremely strong magnetic force, for example neodymium magnets. The permanent magnet 64 is accommodated in the holding case 63 so that polarity of the surface of top dead center side (top pole surface 60a) is N-pole, in this embodiment. The permanent magnet 64 of the second piston magnet member 61 is also accommodated in the holding case 63 so that polarity of the surface of top dead center side (top pole surface 61a) is N-pole.

About both of the first, second piston magnet members 60, 61, connecting parts 65 are formed on the crankshaft 11 side of the holding cases 63. The first, second connecting rods 80, 81 are connected with the respective connecting parts 65 so as to turn practicably.

The first fixed magnet member 70 (similar with the second fixed magnet member 71, not illustrated in FIG. 8, FIG. 9) has a for-fixing holding case 73 and a permanent magnet 74, as illustrated in FIG. 8, FIG. 9, in detail. The for-fixing holding case 73 is a member having the same size and form with the holding case 63. The permanent magnet 74 is a magnet having a size being fitted to the for-fixing holding case 73 without gap, and it has an approximately rectangular parallel piped shape. The permanent magnet 74 is, for example, the same neodymium magnet with the permanent magnet 64. The permanent magnet 74 is accommodated in the for-fixing holding case 73 so that the surface (fixed pole surfaces 70a, 71a), having the same polarity (N-pole, in this embodiment) with polarity of the top pole surfaces 60a, 61a oppose the top pole surfaces 60a, 61a. The permanent magnet 74 of the second fixed magnet member 71 is also accommodated in the for-fixing holding case 73 so that the fixed pole surface 71a is N-pole.

Both the permanent magnet 74 and the-above described permanent magnet 64 are magnets having extremely strong magnetic force, and because top pole surfaces 60a, 61a and fixed pole surfaces 70a, 71a, having same polarity, oppose each other, both the first repulsive force and second repulsive force are extremely strong.

Further, the first fixed magnet member 70 (similar with the second fixed magnet member 71, not illustrated in FIG. 9) is fixed to the lid part 6 with four adjusting members 75. Namely, screw parts 75a of the adjusting members 75 are inserted to the lid part 6 from outside, and they are screwed into the for-fixing holding case 73. When screw conditions of the screw parts 75a are changed, they bring change of slant of the first fixed magnet member 70 to the lid part 6, thereby slant of the fixed pole surface 70a changes.

Further, an interval D2, arranged hindmost position along a rotating direction of the crankshaft 11, is spread than an interval D1 of another part (the hindmost position is referred to as a "hindmost part" in this embodiment, and it is a part illustrated with numeral 79, in FIG. 9, the interval in the hindmost part 79 is also referred hindmost part interval), in the fixed pole surface 70a and top pole surfaces 60a (similar with the fixed pole surface 71a and top pole surface 61a).

Thereby the rotary power generating apparatus 100 has a repulsive force unequal structure, which the repulsive force between the top pole surface 60a and the fixed pole surface 70a at hindmost part 79 becomes weaker than the repulsive force in another part. Note that an angle between the fixed pole surface 70a and the top pole surface 60a is set predetermined inclined angle α.

The first, second connecting rods 80, 81 are connected with the bottom dead center sides (connecting parts 65) of the above-described first, second piston magnet members 60, 61. Both of the first, second connecting rods 80, 81 are connected with the crankshaft 11. The first, second connecting rods 80, 81 are respectively connected with the first, second crank parts 11a, 11c of the crankshaft 11.

Next, the first, second demagnetizing belts 30, 130 will be explained. The first, second demagnetizing belts 30, 130 are corresponding to the first, second demagnetizing band like member according to the embodiment of the present invention.

As illustrated in FIG. 5, the first demagnetizing belt 30 has an outside layer member 32, a demagnetizing magnet part 38 and a non-magnetic force part 39. The second demagnetizing belt 130 has the same outside layer member 32 with the first demagnetizing belt 30, the same demagnetizing magnet part 138 with the demagnetizing magnet part 38 and the same non-magnetic force part 139 with the non-magnetic force part 39, not illustrated. The first, second demagnetizing belts 30, 130 rotate in the direction where the crankshaft 11 rotates, in the same cycle with the crankshaft 11.

The outside layer member 32 has a first outside layer part 32a and a second outside layer part 32b. The first, second outside layer parts 32a, 32b have an elasticity and flexibility, and they are formed by band-like shape with a transformable member such as rubber or the like. The first, second outside layer parts 32a, 32b have respectively wall part edged on the circumference, and they have a concavity inside the wall part. The first, second outside layer parts 32a, 32b are bonded together so that the wall part and concavity oppose each other. The demagnetizing magnet part 38 and the non-magnetic force part 39 are arranged inside the concavity formed by the above. Further, both end parts of the outside layer member 32 are connected so that the second outside layer part 32b is disposed inside, and the outside layer member 32 is formed circularly. A plurality of concavities and convexities (not illustrated), which engage with the auxiliary shafts 41a, 41b, 41c, are formed on the surface of the second outside layer part 32b.

It is preferable that fine through holes having size without falling off of the demagnetizing magnet part 38, or a thin-layer part, having thinner thickness such as slits or the like is formed on the first outside layer parts 32a for reinforcement of magnetic force with demagnetizing magnet part 38, not illustrated. Further, as illustrated in FIG. 5(d), it is possible that a first demagnetizing belt 30A, using the first, second outside layer part 32c, 32d are used instead of the first, second outside layer part 32a, 32b. The first, second outside layer part 32c, 32d are belt member made of steel.

Then, as illustrated in FIG. 5(c), the demagnetizing magnet parts 38 are assigned in an area having a slightly larger size than half of the concavity in the first, second outside layer parts 32a, 32b. The non-magnetic force parts 39 are assigned in the remaining area.

The demagnetizing magnet parts 38 have magnetic forces which are weaker than magnetic poles of the top pole surfaces 60a, 61a sides of the first, second piston magnet members 60, 61, and different from polarity of the top pole surfaces 60a, 61a. The demagnetizing magnet parts 38 have later-described strong demagnetizing parts 35, weak demagnetizing parts 36 and middle demagnetizing parts 37. Two flexible magnets such as rubber magnets or the like are adhered so that outside (the first, second layer parts 32a, 32b side) polarity is S-pole. Thereby polarity of the demagnetizing magnet parts 38 is set S-pole. The demagnetizing magnet parts 38 have magnetic force weaker than the permanent magnets 64, 74.

The strong demagnetizing parts 35 are part having the strongest magnetic force in the demagnetizing magnet parts 38, parts having the weakest magnetic force are weak demagnetizing parts 36, parts having middle magnetic force of the strong demagnetizing parts 35 and the weak demagnetizing parts 36 are middle demagnetizing parts 37. As illustrated in FIG. 6, in the demagnetizing magnet parts 38, the strong demagnetizing parts 35, middle demagnetizing parts 37 and weak demagnetizing parts 36 are arranged sequentially along with the direction which the crankshaft 11 rotates (referred also to as 'crank rotation direction'). Further, in the demagnetizing magnet parts 138, as illustrated in FIG. 6, the strong demagnetizing parts 135, middle demagnetizing parts 137 and weak demagnetizing parts 136 are arranged sequentially along with the crank rotation direction.

Therefore, when the first demagnetizing belt 30 rotates along with crank rotation direction, as illustrated in FIG. 7(b), because the weak demagnetizing parts 36, the middle demagnetizing parts 37 and the strong demagnetizing parts 35 appear sequentially on the top pole surface 60a, the magnetic forces of the demagnetizing magnet parts 38 change to become strong gradually along the peripheral direction. The demagnetizing magnet parts 38 have magnetic force changing structures which the magnetic force change in this manner. Further, the non-magnetic force parts 39 appear following the demagnetizing magnet parts 38, the weak demagnetizing parts 36 appear afterward.

Further, when the second demagnetizing belt 130 rotates along with crank rotation direction, the weak demagnetizing parts 136, the middle demagnetizing parts 137 and the strong demagnetizing parts 135 appear sequentially on the top pole surface 61a. The demagnetizing magnet parts 138 also have the same magnetic force changing structures with the demagnetizing magnet parts 38. However, positions of the first, second demagnetizing belts 30, 130 are adjusted so that positions of the demagnetizing magnet parts 38, 138 along the crank rotation direction are different in half-rotation, as illustrated in FIG. 6, and the first, second demagnetizing belts 30, 130 are engaged respectively with the three auxiliary shafts 41a, 41b, 41c. Therefore, there is a difference in accordance with the half-rotation between the timing which the demagnetizing magnet parts 38 appear in the first gap and the timing which the demagnetizing magnet parts 138 appears in the second gap.

Further, there is also a difference in accordance with the half-rotation between positions of the non-magnetic force parts 39 along the crank rotation direction and positions of the non-magnetic force parts 139 along the crank rotation direction. Because the non-magnetic force parts 39, 139 are assigned in the area having a slightly smaller size than half of the first, second outside layer parts 32a, 32b, only one of the non-magnetic force parts 39, 139 appears in the first, second gaps, both of them never appear in the first, second gaps simultaneously.

The non-magnetic force parts 39, 139 correspond to the parts between the strong demagnetizing parts 35, 135 and the weak demagnetizing parts 36, 136 except for the demagnetizing magnet parts 38, 138 of the first, second demagnetizing belts 30, 130. The non-magnetic force parts 39, 139 are parts no having magnetic force.

Further, the first, second demagnetizing belts 30, 130 are engaged with the three auxiliary shafts 41a, 41b, 41 c so that the rotary power generating apparatus 100 has the following structure. Therefore, the respective position of the first, second demagnetizing belts 30, 130 are adjusted when the first, second demagnetizing belts 30, 130 are engaged with the auxiliary shafts 41a, 41b, 41c, in the rotary power generating apparatus 100. The structure is a structure which the second piston magnet member 61 reaches the bottom dead center at the moment when the first piston magnet member 60 reaches the top dead center, immediately after that, at the first gap, the demagnetizing magnet parts 38 of the first demagnetizing belt 30 changes to the non-magnetic force part 39, and the weak demagnetizing magnet parts 136 of the second demagnetizing belt 130 are arranged in the second gap (hereinafter this structure is also referred to as a "basic structure").

Note that the first gap is a part between the first piston magnet member 60 and the first fixed magnet member 70, and the second gap is a part between the second piston magnet member 61 and the second fixed magnet member 71.

Action Contents of the Rotary Power Generating Apparatus

Next, action contents of the rotary power generating apparatus 100 will be explained with reference to FIG. 10 to FIG. 19.

Figure 10:
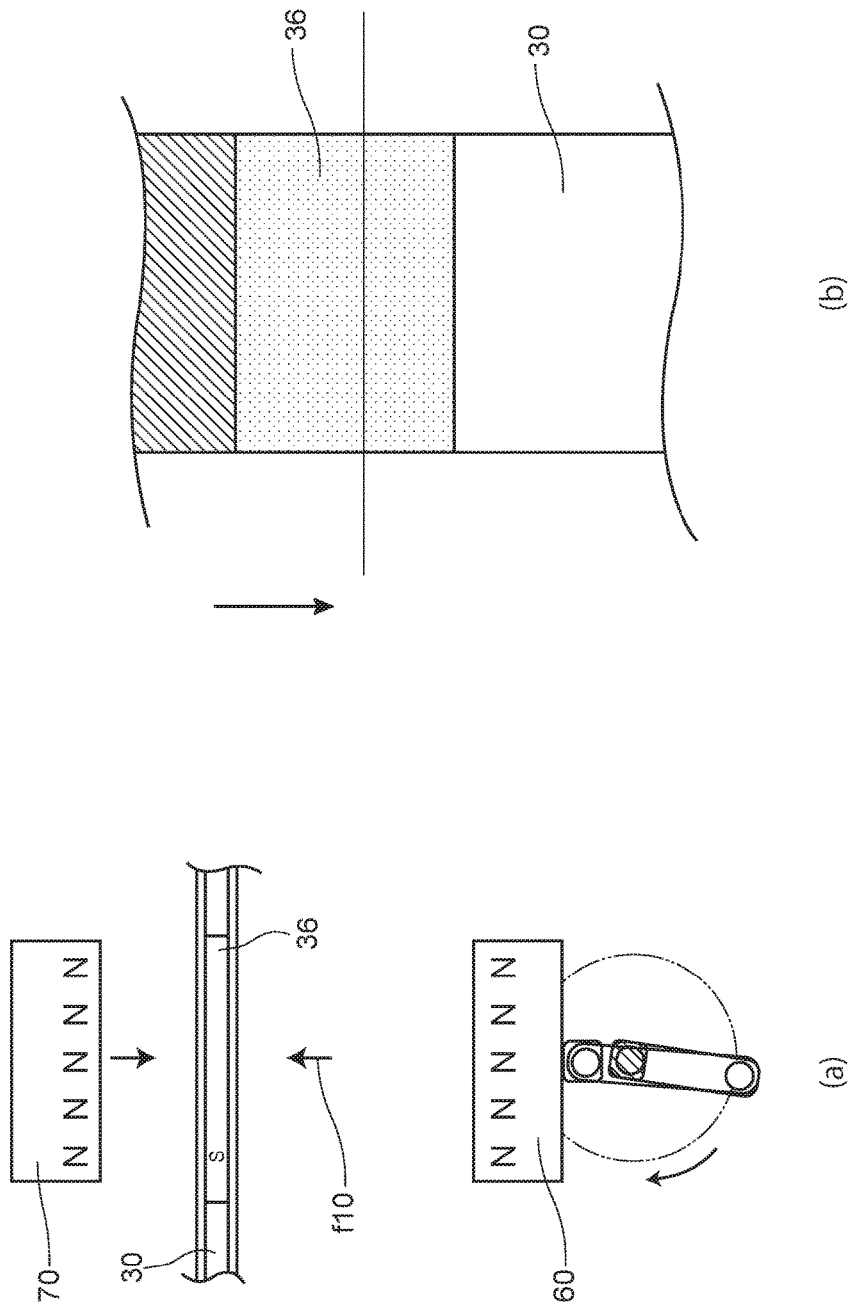
FIG. 10 (a) is a view schematically illustrating the first piston magnet member, the first fixed magnet member and the first demagnetizing belt, immediately after the first piston magnet member reached the bottom dead center, FIG. 10 (b) is a view schematically illustrating the principal part of the first demagnetizing belt at that time.
Figure 11:
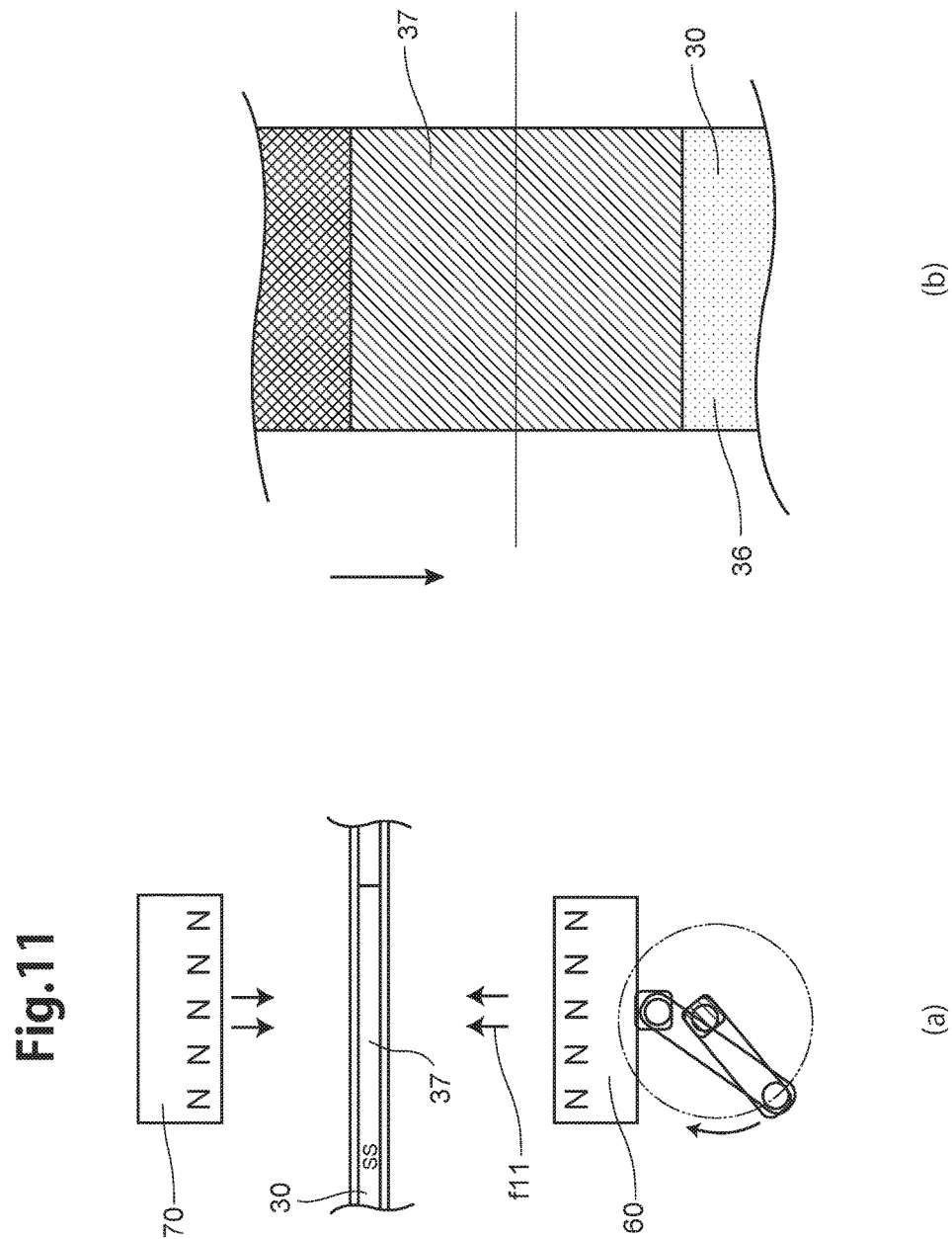
FIG. 11 (a) is a view schematically illustrating the first piston magnet member, the first fixed magnet member and the first demagnetizing belt subsequent to those in FIG. 10 (a), FIG. 11 (b) is a view schematically illustrating a principal part of the first demagnetizing belt subsequent to that in FIG. 10 (b)

Here, FIG. 10 (a) is a view schematically illustrating the first piston magnet member 60, the first fixed magnet member 70 and the first demagnetizing belt 30, immediately after the first piston magnet member 60 reached the bottom dead center, FIG. 10 (b) is a view schematically illustrating a principal part of the first demagnetizing belt 30 at that time. FIG. 11 (a) to FIG. 14 (a) are views schematically illustrating the first piston magnet member 60, the first fixed magnet member 70 and the demagnetizing belt 30 respectively subsequent to those in FIG. 10 (a) to FIG. 13 (a), FIG. 11 (b) to FIG. 14 (b) are views schematically illustrating principal parts of the first demagnetizing belt 30 subsequent to that in FIG. 10 (b) to FIG. 13 (b).

Because the rotary power generating apparatus 100 has the above-described structure, it performs following actions. For operating the rotary power generating apparatus 100, first of all, not-illustrated power switch is turned on to operate the starter motor 14a. When the starter motor 14a operates using electric power stored in the battery 13b, power from the starter motor 14a is transmitted to the crankshaft 11 via the belt 16a, thereby the crankshaft 11 rotates along a direction indicated by the arrow ell in FIG. 2. With this action, the first, second piston magnet members 60, 61 move inside the first, second guide members 50, 51 via the first, second connecting rods 80, 81. Initial action is completed in this manner.

Note that because a not-illustrated overrunning clutch is provided with the starter motor 14a, power from the crankshaft 11 is not transmitted to the starter motor 14a. Further, the rotary power generating apparatus 100 utilizes power from the starter motor 14a in the above-described initial action, and it also utilizes power from the starter motor 14a regularly (for example, in every several seconds) after the initial action is completed. Further, the rotary power generating apparatus 100 also utilizes power from the starter motor 14a when the number of rotations of the crankshaft 11 become smaller than the set-up number of rotations. In these cases, the timer relay 13c operates, thereby the starter motor 14a operates with supplied power from the battery 13b, and power from the starter motor 14a is transmitted to the crankshaft 11. Actions of the rotary power generating apparatus 100 are, after the initial action is completed, as follows.

Here, as illustrated in FIG. 10 (a), a condition, immediately after the first piston magnet member 60 reaches the bottom dead center, is supposed. At this time, because the crankshaft 11 tries to continue the former rotation because of its inertia, the first piston magnet member 60 tries to approach the first fixed magnet member 70.

At this time, the weak demagnetizing parts 36 of the first demagnetizing belt 30 appear in the first gap, at the timing that the first piston magnet member 60 reaches the bottom dead center. As illustrated in FIG. 10 (b), the weak demagnetizing parts 36 are still arranged in the first gap, immediately after the first piston magnet member 60 reach the bottom dead center. Because, the polarity of the weak demagnetizing parts 36 are different from the polarities of the top pole surface 60a, the fixed pole surfaces 70a, the weak demagnetizing parts 36 display demagnetizing operation to weaken the magnetic forces emitted from the top pole surface 60a, the fixed pole surface 70a. A first repulsive force, which always operates between the first piston magnet member 60 and the first fixed magnet member 70, is reduced only with an attractive force f10, because of the demagnetizing operation. Thereby, the first piston magnet member 60 becomes easy to progress.

Next, as illustrated in FIG. 11 (a), the first piston magnet member 60 progress, and in company with this action, as illustrated in FIG. 11 (b), the weak demagnetizing parts 36 of the first demagnetizing belt 30 change to the middle demagnetizing parts 37, the middle demagnetizing parts 37 appear in the first gap. The first repulsive force increase in accordance with the progress of the first piston magnet member 60 though, the first repulsive force is reduced only with an attractive force f11, larger than the attractive force f10, in company with the switch from the weak demagnetizing parts 36 to the middle demagnetizing parts 37. Therefore the first piston magnet member 60 progresses continuously.

Subsequently, as illustrated in FIG. 12 (a), the first piston magnet member 60 progress, and in company with this action, as illustrated in FIG. 12 (b), the middle demagnetizing parts 37 of the first demagnetizing belt 30 change to the strong demagnetizing parts 35, the strong demagnetizing parts 35 are arranged in the first gap. Therefore, the first repulsive force is reduced only with an attractive force f12, larger than the attractive force f11, the first piston magnet member 60 progresses continuously.

Furthermore, the first piston magnet member 60 progresses. At this time, because the strong demagnetizing parts 35 are also arranged in the first gap, the first repulsive force is reduced only with the attractive force f12. When the first piston magnet member 60 progresses continuously, after that, as illustrated in FIG. 13 (a), the first piston magnet member 60 reaches the top dead center. At this time, as illustrated in FIG. 13 (b), the strong demagnetizing parts 35 are partially arranged in the first gap.

Then, as illustrated in FIG. 14 (a), immediately after the first piston magnet member 60 reach the top dead center, the strong demagnetizing parts 35 of the first demagnetizing belt 30 change to the non-magnetic force parts 39 in the first gap, and the non-magnetic force parts 39 are arranged in the first gap instead of the strong demagnetizing parts 35.

Whereupon, the first repulsive force is reduced due to the demagnetizing operations of the strong demagnetizing parts 35 until that time, reducing operation concerning the first repulsive force disappears suddenly, due to the switching from the strong demagnetizing parts 35 to the non-magnetic force parts 39. Therefore, as illustrated in FIG. 14 (a), a mighty first repulsive force f14 revives suddenly between the first piston magnet member 60 and the first fixed magnet member 70. The first piston magnet member 60 is push down strongly due to the first repulsive force f14, immediately after the first piston magnet member 60 reaches the top dead center, and it regresses vigorously along to the direction illustrated f60.

Note that because the first connecting rod 80 extends straight vertically when the first piston magnet member 60 reaches the top dead center, the first piston magnet member 60 is hard to regress even if the first repulsive force operates. It is preferable that the strong demagnetizing parts 35 change to the non-magnetic force parts 39 immediately after the first piston magnet member 60 reach the top dead center, for easy regress of the first piston magnet member 60.

The action, from immediately after the first piston magnet member 60 reaches the bottom dead center to immediately after the first piston magnet member 60 reaches the top dead center, is explained in the above. Action of each first, second piston magnet member 60, 61, from immediately after the first, second piston magnet member 60, 61 reaches respectively the bottom dead center to immediately after the first, second piston magnet member 60, 61 reach respectively the top dead center, is referred also as progress action. Further, action of each first, second piston magnet member 60, 61, from immediately after the first, second piston magnet member 60, 61 reaches respectively the top dead center to immediately after the first, second piston magnet member 60, 61 reaches respectively the bottom dead center, is referred also as regress action. The progress action concerning the above-described first piston magnet member 60 is parallel with the regress action of the second piston magnet member 61.

Then the rotary power generating apparatus 100 has the second demagnetizing belt 130 in addition to the first demagnetizing belt 30. The first piston magnet member 60, the first fixed magnet member 70, and the second piston magnet member 61, the second fixed magnet member 71 perform the progress action alternately, in the rotary power generating apparatus 100. Subsequently, the action will be explained with reference to FIG. 15 to FIG. 19.

Here, FIG. 15 (a) is a view schematically illustrating the first, second piston magnet members 60, 61 and the crankshaft 11, immediately after the first, second piston magnet members 60, 61 reached the top dead center, bottom dead center respectively, FIG. 15 (b) is a view schematically illustrating the first, second demagnetizing belts 30, 130 at that time. FIG. 16 (a) to FIG. 19 (a) are views schematically illustrating the first, second piston magnet members 60, 61 and the crankshaft 11 respectively subsequent to those in FIG. 15 (a) to FIG. 18 (a), FIG. 16 (b) to FIG. 19 (b) are views schematically illustrating the first, second demagnetizing belts 30, 130 respectively subsequent to that in FIG. 15 (b) to FIG. 18 (b).

At first, as illustrated in FIG. 15 (a), a condition, immediately after the first, second piston magnet members 60, 61 reach respectively the top dead center, the bottom dead center, is supposed. In this case, the first, second demagnetizing belts 30, 130 are engaged with the auxiliary shafts 41a, 41b, 41c so that the rotary power generating apparatus 100 has the above-described basic structure. Therefore, demagnetizing magnet parts 38 (strong demagnetizing parts 35) change to the non-magnetic force parts 39 in the first gap, and the weak demagnetizing parts 36 are arranged in the second gap. Accordingly, the first piston magnet member 60 regresses vigorously along the direction illustrated f60, and the second piston magnet member 61 progresses due to the reducing of the second repulsive force.

Subsequently, as illustrated in FIG. 16 (a), the second piston magnet member 61 progresses due to the reducing of the second repulsive force coincidentally with the vigor regress of the first piston magnet member 60. When the action continues, as illustrated in FIG. 17 (a), the first, second crank parts 11a, 11c of the crankshaft 11 become parallel.

At this time, as illustrated in FIG. 17 (b), the non-magnetic force parts 39 are arranged in the first gap, and the strong demagnetizing parts 35 are arranged in the second gap coincidentally. Therefore, the crankshaft 11 rotates continuously so that the second piston magnet member 61 progresses while the first piston magnet member 60 regress. Further, because the first, second demagnetizing belts 30, 130 keep the same condition, as illustrated in FIG. 18 (a), this condition also continues after that.

Whereupon, next time, as illustrated in FIG. 19 (a), the first piston magnet member 60 reaches the bottom dead center and the second piston magnet member 61 reaches the top dead center. Therefore, the first, second piston magnet members 60, 61 perform the progress actions alternately and repeatedly.

As mentioned above, the first, second piston magnet members 60, 61 continue the progress action and the regress action repeatedly. Therefore, reciprocation of the first, second piston magnet members 60, 61 are able to be realized, and the reciprocation is performed continuously with power of the starter motor 14a, and the continuity of the reciprocation is able to be enhanced, in the rotary power generating apparatus 100. The number of rotations of the crankshaft 11 reduces due to influence of frictional force and so on that was caused by motions of each member such as the crankshaft 11, the first, second piston magnet members 60, 61 or the like. Whereupon, the reciprocation of the first, second piston magnet members 60, 61 are difficult to continue. Therefore, power of the starter motor 14a is utilized in the rotary power generating apparatus 100, as mentioned above.

Further, if the assist motor 14S is provided, continuity of reciprocation of the first, second piston magnet members 60, 61 is able to be enhanced with power of the assist motor 14S. In this case, because the electric power from the battery 13b is supplied to the assist motor 14S, the electric power stored in the battery 13b is consumed. Thereby, extra charge of the battery 13b is prevented.

Continuity of the reciprocation of the first, second piston magnet members 60, 61 brings continuity of the rotary motion of the crankshaft 11 via the first, second connecting rods 80, 81. Whereupon, rotary power of the crankshaft 11 is transmitted to the motor generators 15a, 15b via belt 16b, coils of the motor generators 15a, 15b rotate. Electric power is obtained with the rotation of coils of the motor generators 15a, 15b. This electric power is able to be taken outside with not-illustrated out-put code.

(Operation and Effect of the Rotary Power Generating Apparatus)

As mentioned above, the polarity of magnetic pole of the top pole surfaces 60a, 61a equal to the polarity of magnetic pole of the fixed pole surfaces 70a, 71a, in the first, second piston magnet members 60, 61 and the first, second, fixed magnet members 70, 71. Therefore, the first, second repulsive force, which try to regress the first, second piston magnet members 60, 61 respectively, always operate to the first, second piston magnet members 60, 61 and the first, second, fixed magnet members 70, 71.

However, the first, second demagnetizing belts 30, 130 are arranged respectively in both of the first gap and the second gap. The first, second demagnetizing belts 30, 130 have the demagnetizing magnet parts 38, 138 respectively, and polarities of the magnetic force in the demagnetizing magnet parts 38, 138 are different from the polarities of magnetic poles in the top pole surfaces 60a, 61a, the fixed pole surfaces 70a, 71a.

Therefore, lines of magnetic forces, emitted from the first, second piston magnet members 60, 61 and the first, second, fixed magnet members 70, 71, are partially absorbed in the first, second demagnetizing magnet parts 38, 138. Whereupon, because lines of magnetic forces, contribute to repulsing between the top pole surfaces 60a, 61a and the fixed pole surfaces 70a, 71a are reduced, magnetic forces, which bring the first, second repulsive force, is reduced. Because the demagnetizing magnet parts 38, 138 exhibit the above-mentioned demagnetizing operation which reduce the magnetic force, the first, second repulsive forces are reduced due to the appearances of the demagnetizing magnet parts 38, 138 in the first, second gaps.

Then, the first, second demagnetizing belts 30, 130 are engaged with the auxiliary shafts 41a, 41b, 41c so that the respective positions, along the crank rotation direction of the demagnetizing magnet parts 38, 138 of the first, second demagnetizing belts 30, 130, are different in half-rotation. Further, the powers of the crankshaft 11 are transmitted to the auxiliary shafts 41a, 41b, 41c via the auxiliary gears 17, 18a, 18b, 18c. Thereby the first, second demagnetizing belts 30, 130 rotate with the crankshaft 11. In this case, the non-magnetic force parts 39, 139 are arranged in only one of the first, second gaps, and they are never arranged in both of the first, second gaps at the same time.

Therefore, the first, second repulsive force, without being reduced, never operate to the first, second piston magnet members 60, 61 at the same timing. If the first, second repulsive force, without being reduced, operate to the first, second piston magnet members 60, 61 at the same timing, both of the first, second piston magnet members 60, 61 try to regress, thereby there is the possibility which the reciprocation is not be able to be obtained. However, the rotary power generating apparatus 100 does not have the above possibility.

Further, because demagnetizing operations, by the demagnetizing magnet parts 38, 138 operates to at least one of the first, second repulsive forces, the second piston magnet member 61 progress easily when the first piston magnet member 60 regress, and inversely, the first piston magnet member 60 progress easily when the second piston magnet member 61 regress. The first, second repulsive force always operate to the first, second piston magnet members 60, 61 respectively, however, the first, second repulsive force, having same strength, never operate to the first, second piston magnet members 60, 61 at the same timing. Therefore, the first, second piston magnet members 60, 61 are able to be regressed alternately. Further, one of the first, second piston magnet members 60, 61 regresses, after that the other regresses smoothly because of the inertia of the crankshaft 11. Therefore, regress actions of the first, second piston magnet members 60, 61 are continued.

By the way, as the power transmitting machinery disclosed in the patent document 3, two magnets having different polarity approach to two piston magnets alternately, thereby the repulsive force and attractive force become to operate alternately, in the conventional technology.

However, if once the piston magnets are kept away by the repulsive force, it is impossible that the piston magnets return to the original position with the attractive force, even if extremely powerful magnet is utilized. Namely, reciprocation of the piston magnet is not able to be obtained by operating the repulsive force and attractive force to the piston magnet alternately.

On this point, only repulsive force operates to the first, second piston magnet members 60, 61, however the reciprocation is not able to be obtained by operating the repulsive force having same strength to them, in view of the point, so the rotary power generating apparatus 100 has the above-mentioned structure.

Namely, while one of the first, second piston magnet members 60, 61 regress, progress of the other is supported by the reduction of the repulsive force, thereby the reciprocations of the piston magnet members are realized, further the reduction of the repulsive force is performed alternately, furthermore power of the starter motor 14a is utilized, thereby they make the reciprocation of the piston magnet members sustainable, in the rotary power generating apparatus 100.

The first, second demagnetizing belts 30, 130 are effective in reduction of the repulsive force alternately. Band-like members, having width capable of covering the both top pole surfaces 60a, 61a of the first, second piston magnet members 60, 61, are formed circularly to form the first, second demagnetizing belts 30, 130, and the first, second demagnetizing belts 30, 130 have respectively the demagnetizing magnet parts 38, 138 and the non-magnetic force parts 39, 139. Furthermore, there is a difference in accordance with the half-rotation between the positions of the demagnetizing magnet parts 38 along the crank rotation direction and the positions of the demagnetizing magnet parts 138 along the crank rotation direction.

Therefore, reduction of the repulsive force to the first, second piston magnet members 60, 61 are able to be performed alternately because of the rotations of the first, second demagnetizing belts 30, 130. Accordingly, in the rotary power generating apparatus 100, reciprocations of the first, second piston magnet members 60, 61 are able to be obtained, and utilizing the power of the starter motor 14a makes the reciprocation sustainable, and the continuity is able to be enhanced. Thereby, continuous rotary power, which the crankshaft 11 rotates continuously, is able to be obtained.

Further, because magnetic forces of the demagnetizing magnet parts 38, 138 are weaker than magnetic forces of magnetic poles of the first, second piston magnet members 60, 61, the first, second repulsive forces are able to be kept, even if the lines of magnetic forces are absorbed by the demagnetizing magnet parts 38, 138.

On the other hand, the rotary power generating apparatus 100 has the repulsive force unequal structure concerning the first piston magnet member 60, the first fixed magnet member 70 and the second piston magnet member 61, the second fixed magnet member 71.

When the crankshaft 11 rotates, for example, as illustrated in FIG. 9, FIG. 14 (a), the first crank part 11a inclines toward front side along to the rotating direction of the crankshaft 11, at the timing immediately after the first piston magnet member 60 reaches the top dead center. The first repulsive force always operates to the first piston magnet member 60. Therefore, the first repulsive force tries to regress the first piston magnet member 60, even if the first piston magnet member 60 reaches the top dead center and the first crank part 11a rises vertically. However, moment is not able to be obtained, even if the repulsive force operates, when the first crank part 11a rises vertically, therefore the crankshaft 11 is difficult to rotate, accordingly the first piston magnet member 60 is difficult to regress.

However, in case of the repulsive force unequal structure, because the repulsive force of other part is stronger than that of the hindmost part 79, front side of the first piston magnet member 60 along to the rotating direction of the crankshaft 11 is easy to regress, even if the first piston magnet member 60 reaches the top dead center. Therefore, if the rotation of the crankshaft 11 continues due to its inertia to incline the first crank part 11a toward front side, the first piston magnet member 60 is easy to regress, and the first piston magnet member 60 is more easily to regress with disappearance of the reducing operation of the repulsive force at the moment. Accordingly, continuity of the reciprocation, concerning the rotary power generating apparatus 100, is able to be more enhanced.

Further, because the demagnetizing magnet parts 38, 138 have the magnetic force changing structure, when the first, second demagnetizing belts 30, 130 rotates, the repulsive force reducing operation is improved stepwise. Whereupon, the first, second repulsive force, which are improved in accordance with the progresses of the first, second piston magnet members 60, 61, are able to be reduced stepwise. Therefore, progresses of the first, second piston magnet members 60, 61 become sure, thereby the reciprocation is able to be performed surely.

Then the first, second demagnetizing belts 30, 130 rotate with the crankshaft 11, the first, second demagnetizing belts 30, 130 also perform one rotation when the crankshaft 11 performs one rotation. One rotation of the crankshaft 11 corresponds to the one process of the reciprocation of the first, second piston magnet members 60, 61. Therefore, one cycle of demagnetizing operation by the first, second demagnetizing belts 30, 130 is correlated with the one process of the first, second piston magnet members 60, 61.

On the other hand, in the rotary power generating apparatus 100, the gap parts 53 are formed in the first, second guide members 50, 51. Frictional heat is generated due to friction with the first, second piston magnet members 60, 61 and the first, second guide members 50, 51 with the reciprocation of the first, second piston magnet members 60, 61. However, this frictional heat is able to be radiated outside of the first, second guide members 50, 51 from the gap parts 53.

In general, it is known that spontaneous magnetization of a ferromagnetic body is decreased exponentially with temperature increasing, magnetic character of the ferromagnetic body will be lost when the temperature exceeds the Curie temperature. Therefore, when frictional heat is generated to be stored in first, second piston magnet members 60, 61, there is a possibility that the magnetic forces of the permanent magnets 64, 74 are decreased. Whereupon, the first, second repulsive forces become weak, there is a possibility that reciprocation of the first, second piston magnet members 60, 61 is not able to be repeated.

Especially, as conventional technology, when the piston magnet is accommodated inside the cylinder with a sealing up, frictional heat, according to friction of the piston magnet and the cylinder, is likely to be filled inside the cylinder, therefore temperature of the piston magnet is likely to be increased.

However, in case of the rotary power generating apparatus 100, because the gap parts 53 are formed in the first, second guide members 50, 51, heat such as frictional heat or the like is difficult to be filled. Accordingly, the decline of magnetic force of the permanent magnets 64, 74 is able to be prevented, and reciprocation of the first, second piston magnet members 60, 61 is able to be continued.

Then, in case of the rotary power generating apparatus 100, inclined angle of the fixed pole surfaces 70a, 71a, in the first, second fixed magnet members 70, 71, is able to be adjusted with adjusting members 75. Therefore, even if the inclined angle of the fixed pole surfaces 70a, 71 a change due to vibration or the like, during operation, the inclined angle is able to be adjusted.

Note that the rotary power generating apparatus 100 can generate electric power by transmitting the above-described continuous rotary power of the crankshaft 11 to the internal motor generators 15a, 15b, it can be utilized as electric generating apparatus. Of course, the rotary power can be utilized for other uses.

MODIFIED EXAMPLE 1

FIG. 20 (a) is a perspective view illustrating a guide member 54 according to a modified example 1 with a part thereof omitted. The guide member 54 has two holding members 55 having almost c-figure shape in its cross section. Each holding member 55 is arranged separately so that gap parts 55a are formed. The guide member 54 can also guide first, second piston magnet members 60, 61, and radiate frictional heat to outside, as the first, second guide members 50, 51.

Further, FIG. 20 (b) is a sectional view of the demagnetizing belt 40 according to the modified example 1. The demagnetizing belt 40 is different from the demagnetizing belt 30 in that the demagnetizing belt 40 has demagnetizing magnet parts 48 instead of the demagnetizing magnet parts 38. The demagnetizing magnet parts 48 are different from the demagnetizing magnet parts 38 in that the demagnetizing magnet parts 48 have strong demagnetizing parts 45 and weak demagnetizing parts 46, do not have middle demagnetizing parts. The strong demagnetizing parts 45 have similar magnetic forces with the strong demagnetizing parts 35, and they have larger size than the strong demagnetizing parts 35. The weak demagnetizing parts 46 are similar with the weak demagnetizing parts 36. The above-mentioned demagnetizing magnet parts 48 have also the magnetic force changing structure which the magnetic force changes so as to become strong gradually along the peripheral direction, similar with the demagnetizing magnet parts 38.

Further, not illustrated though, it is preferable that the first, second demagnetizing chains are able to be used instead of the first, second demagnetizing belts 30, 130. The first, second demagnetizing chains are formed with circular-shape having lateral length similar with the first, second demagnetizing belts 30, 130, and they have the demagnetizing magnet parts 38 and non-magnetic force parts 39 in their inside.

Note that the demagnetizing belt 40 is able to be used instead of not only the first demagnetizing belt 30 but also the second demagnetizing belt 130.

MODIFIED EXAMPLE 2

Subsequently, the rotary power generating apparatus 200, according to the modified example 2 will be explained with reference to FIG. 21. The rotary power generating apparatus 200 is different from the above-described the rotary power generating apparatus 100 in that the rotary power generating apparatus 200 has the engine part 110, motor generators 15c, 15d and belt 16c.

Figure 21:
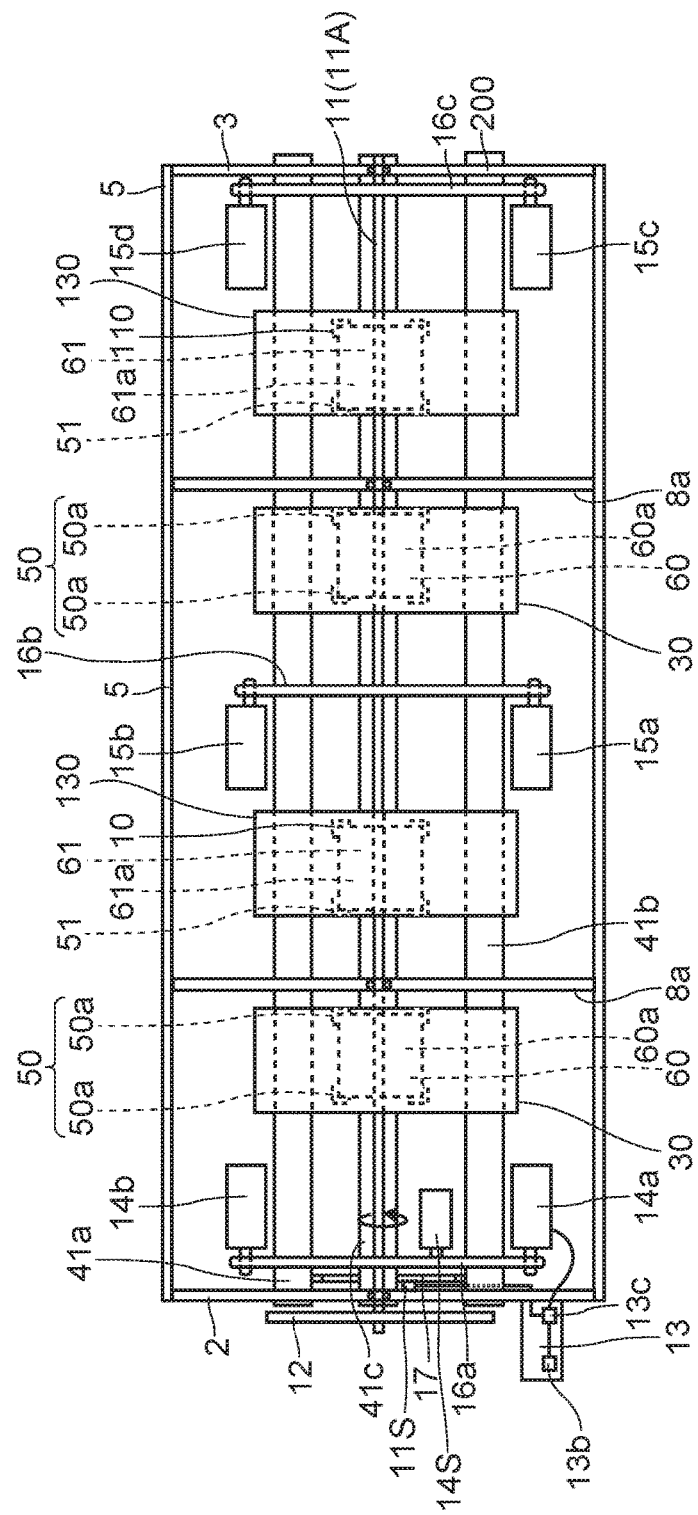
FIG. 21 is a plan view, similar with FIG. 3, illustrating the rotary power generating apparatus according to a modified example.

The engine part 110 has, similar with the above-described engine part 10, the crankshaft 11, the first, second guide members 50, 51, the first, second piston magnet members 60, 61, the first, second fixed magnet members 70, 71 not illustrated in FIG. 21, the first, second connecting rods 80, 81 not illustrated in FIG. 21 and the first, second demagnetizing belts 30, 130. Further, the motor generators 15c, 15d have respectively common structure with the above-described motor generators 15a, 15b. The belt 16c has a common structure with the belt 16b.

Both of the engine part 10 and the engine part 110 of the rotary power generating apparatus 200 have respectively the crankshaft 11, the crankshaft 11 in the engine part 10, the crankshaft 11 in the engine part 110 constitute the one common crankshaft 11A, being common to both of the engine part 10 and the engine part 110. Further, the engine parts 10, 110 have a common phase about the first, second piston magnet members 60, 61.

Rotary power of the crankshaft 11 is obtained from reciprocation of the first, second piston magnet members 60, 61 in the engine part 10, in case of the above-described rotary power generating apparatus 100.

On the other hand, in case of the rotary power generating apparatus 200, the reciprocation of the first, second piston magnet members 60, 61 in the engine part 10 and the reciprocation of the first, second piston magnet members 60, 61 in the engine part 110 are performed with overlapping, the overlapping reciprocation makes the rotation of the crankshaft 11 (common crankshaft 11A). Therefore, rotary power of the crankshaft 11 (common crankshaft 11A) become more powerful than that of the rotary power generating apparatus 100.

MODIFIED EXAMPLE 3

Figure 22:
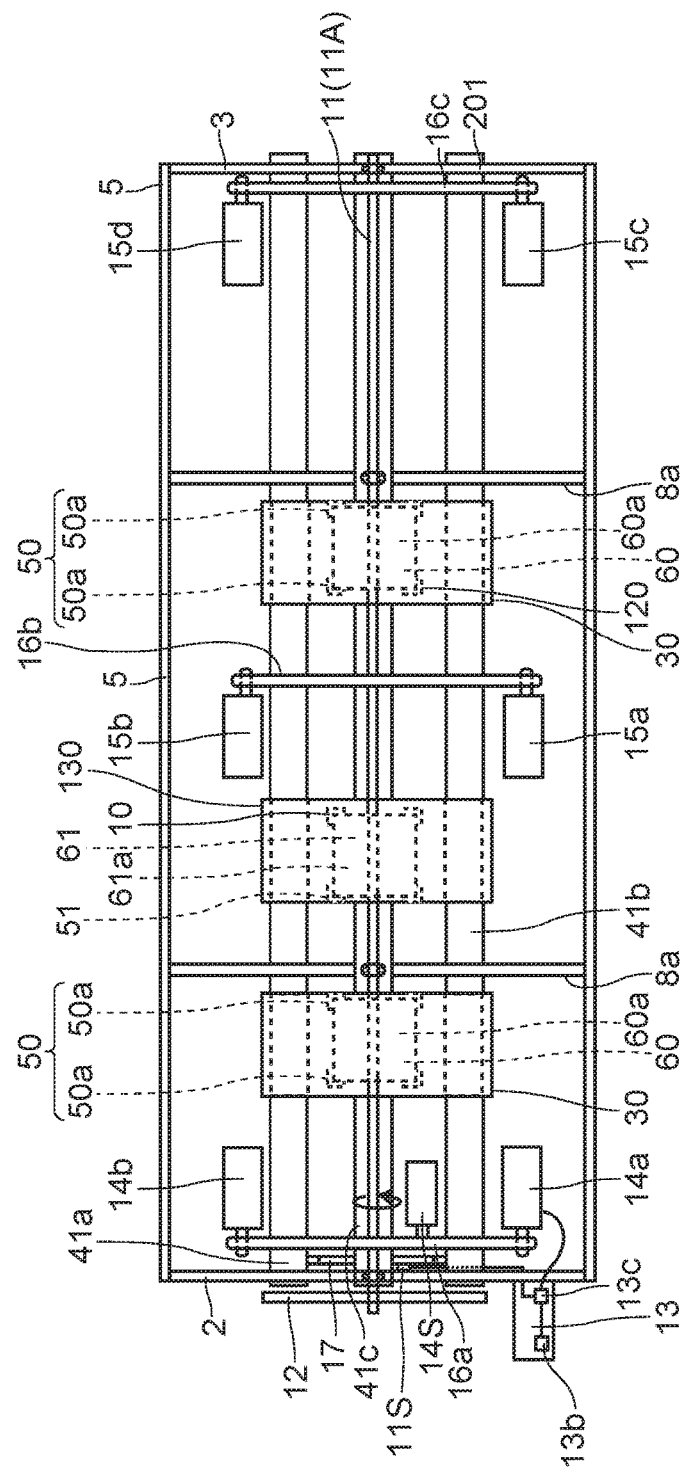
FIG. 22 is a plan view, similar with FIG. 3, illustrating the rotary power generating apparatus according to another modified example.

Subsequently, the rotary power generating apparatus 201, according to the modified example 3 will be explained with reference to FIG. 22. The rotary power generating apparatus 201 is different from the above-described the rotary power generating apparatus 100 in that the rotary power generating apparatus 201 has the engine part 120, motor generators 15c, 15d and belt 16c.

The engine part 120 is different from the above-described engine part 10 in that the engine part 120 does not have the second guide member 51, the second piston magnet member 61, the second fixed magnet member 71, the second connecting rod 81 and the second demagnetizing belt 130. Further, the motor generators 15c, 15d have respectively common structures with the above-described motor generators 15a, 15b. The belt 16c has a common structure with the belt 16b.

The rotary power generating apparatus 201 has also the one common crankshaft 11A, constituted of the crankshaft 11 in the two engine parts 10, 210, being common with the two engine parts 10, 210, similar with the rotary power generating apparatus 200. Further, both the engine parts 10, 120 have a common phase about the first piston magnet member 60.

In case of the rotary power generating apparatus 201, the reciprocation of the first piston magnet member 60 in the engine part 10 and the reciprocation of the first piston magnet member 60 in the engine part 120 are performed with overlapping, the overlapping reciprocation makes the rotation of the crankshaft 11 (common crankshaft 11A). Therefore, rotary power of the crankshaft 11 (common crankshaft 11A) become more powerful than that of the rotary power generating apparatus 100.

Second Embodiment
(Structure of Rotary Power Generating Apparatus)

To begin with, the structure of the rotary power generating apparatus 101 according to the second embodiment of the present invention will be explained with reference to FIG. 23.

Figure 23:
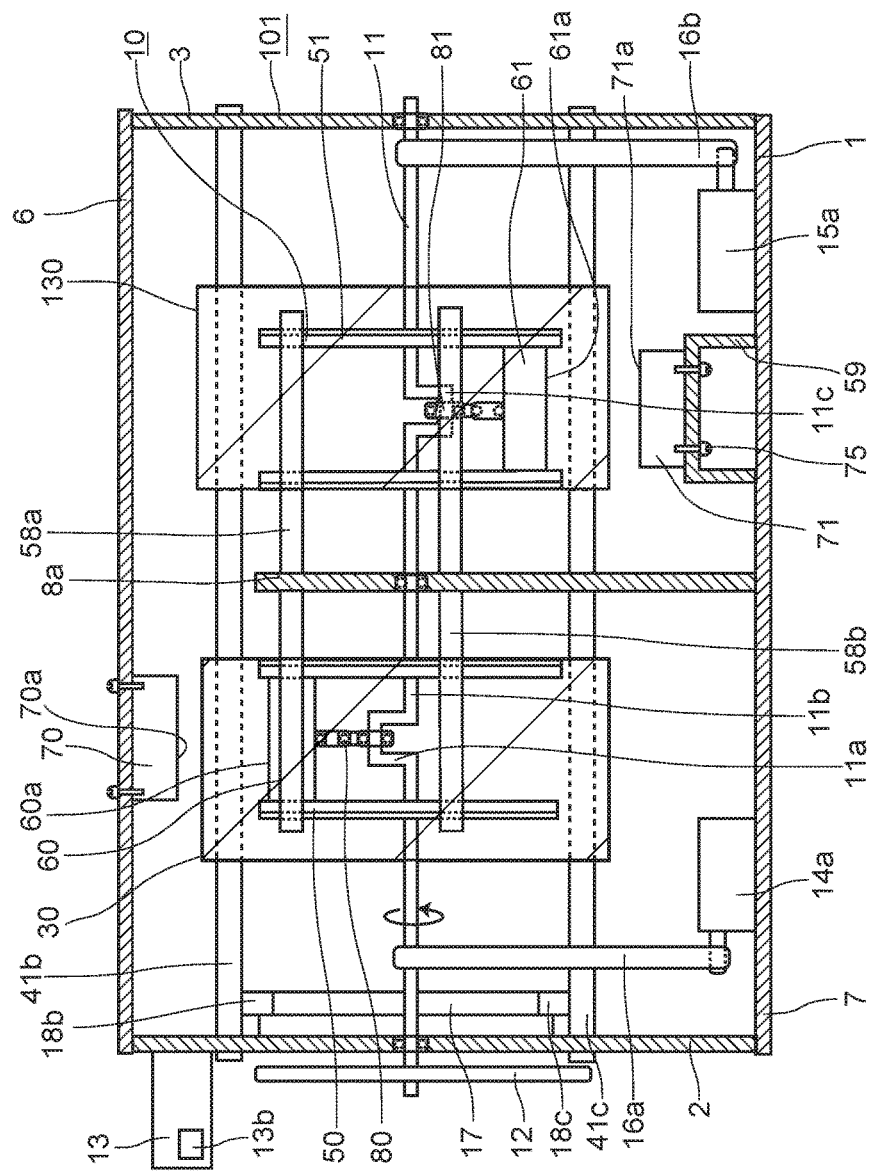
FIG. 23 is a sectional view, corresponding to FIG. 2, of the rotary power generating apparatus according to a second embodiment of the present invention.

Here, FIG. 23 is a sectional view, corresponding to FIG. 2, illustrating the rotary power generating apparatus 101 according to the second embodiment of the present invention.

The rotary power generating apparatus 101 is different from the rotary power generating apparatus 100 in that the second piston magnet member 61, the second fixed magnet member 71 and the second connecting rod 81 are arranged respectively in another positions, and the rotary power generating apparatus 101 has a mounting-stand 59. Further, the rotary power generating apparatus 101 is different from the above-described the rotary power generating apparatus 100 in that the rotary power generating apparatus 101 has an auxiliary shaft 41d and an auxiliary gear 18d in addition to the three auxiliary shafts 41a, 41b, 41c and the three auxiliary gears 18a, 18b, 18c, as illustrated in FIG. 4(b).

In case of the rotary power generating apparatus 100, the first, second piston magnet members 60, 61 are arranged so that the respective top pole surfaces 60a, 61a face the same direction from the crankshaft 11.

In contrast to the above, in case of the rotary power generating apparatus 101, the first, second piston magnet members 60, 61 are arranged so that the respective top pole surfaces 60a, 61 a face the contrary direction from the crankshaft 11. Namely, the first, second piston magnet members 60, 61 are arranged so that the top pole surfaces 60a, 61a face respectively the lid part 6, and the bottom part 1. In case of FIG. 23, the top pole surfaces 60a is upward, and the top pole surfaces 61a is downward.

Further, the second connecting rod 81 is also arranged downward from the crankshaft 11, facing the bottom part 1.

The second fixed magnet member 71 is fixed on the mounting-stand 59 with the four adjusting members 75. The mounting-stand 59 is fixed on the bottom part 1 inside of the housing 7, as illustrated in FIG. 23. When screw conditions of the screw parts 75a are changed, they also bring change of slant of the second fixed magnet member 71 to the mounting-stand 59, similar with the first fixed magnet member 70, thereby slant of the fixed pole surface 71a changes. The fixed pole surface 71a and the top pole surface 61a are arranged to be opposed each other.

The auxiliary shaft 41d is arranged the lower side than the crankshaft 11, and it is arranged on the back wall part 5 side than the auxiliary shaft 41c. Further, the auxiliary shaft 41d passes through the left wall part 2, the right wall part 3 and the middle wall part 8a along the crankshaft 11, and it is arranged so that it forms a rectangle with three auxiliary shafts 41a, 41b, 41c. Furthermore, the auxiliary shaft 41d is engaged with the auxiliary gear 18d. The auxiliary gear 18d is supported with the left wall part 2 via bearing.

Then the first demagnetizing belt 30 is engaged with the auxiliary shafts 41a, 41b, 41c, 41d so as to pass through between the fixed pole surface 70a and the top pole surface 60a. The second demagnetizing belt 130 is engaged with the auxiliary shafts 41a, 41b, 41c, 41d so as to pass through between the fixed pole surface 71a and the top pole surface 61a.

Note that if the first piston magnet member 60 is arranged in the highest position, the second piston magnet member 61 is arranged in the lowest position, as illustrated in FIG. 23, in the rotary power generating apparatus 101. The first, second repulsive forces are maximum at this point of time. Accordingly, in the rotary power generating apparatus 101, the highest position and lowest position are set top dead centers, about the first, second piston magnet members 60, 61 respectively (Action Contents of the Rotary Power Generating Apparatus)

The rotary power generating apparatus 101 has also the first piston magnet member 60, the first fixed magnet member 70, the first demagnetizing belt 30, the second piston magnet member 61, the second fixed magnet member 71 and the second demagnetizing belt 130, similar with the rotary power generating apparatus 100.

Therefore, the first piston magnet member 60 also performs the regress action and the progress action, and the second piston magnet member 61 also performs the regress action and the progress action, in the rotary power generating apparatus 101, similar with the rotary power generating apparatus 100.

However, the rotary power generating apparatus 101 is different from the rotary power generating apparatus 100 in that the first, second piston magnet members 60, 61 of the rotary power generating apparatus 101 perform the regress action and the progress action respectively at different timings from the first, second piston magnet members 60, 61 of the rotary power generating apparatus 100.

In case of the above-described rotary power generating apparatus 100, the first, second piston magnet members 60, 61 perform the progress action and the regress action respectively, the action cycle of the first piston magnet member 60 is the same with the action cycle of the second piston magnet member 61. And, as described above, the second piston magnet member 61 performs the progress action when the first piston magnet member 60 performs the regress action, and the second piston magnet member 61 performs the regress action when the first piston magnet member 60 performs the progress action.

Figure 25:
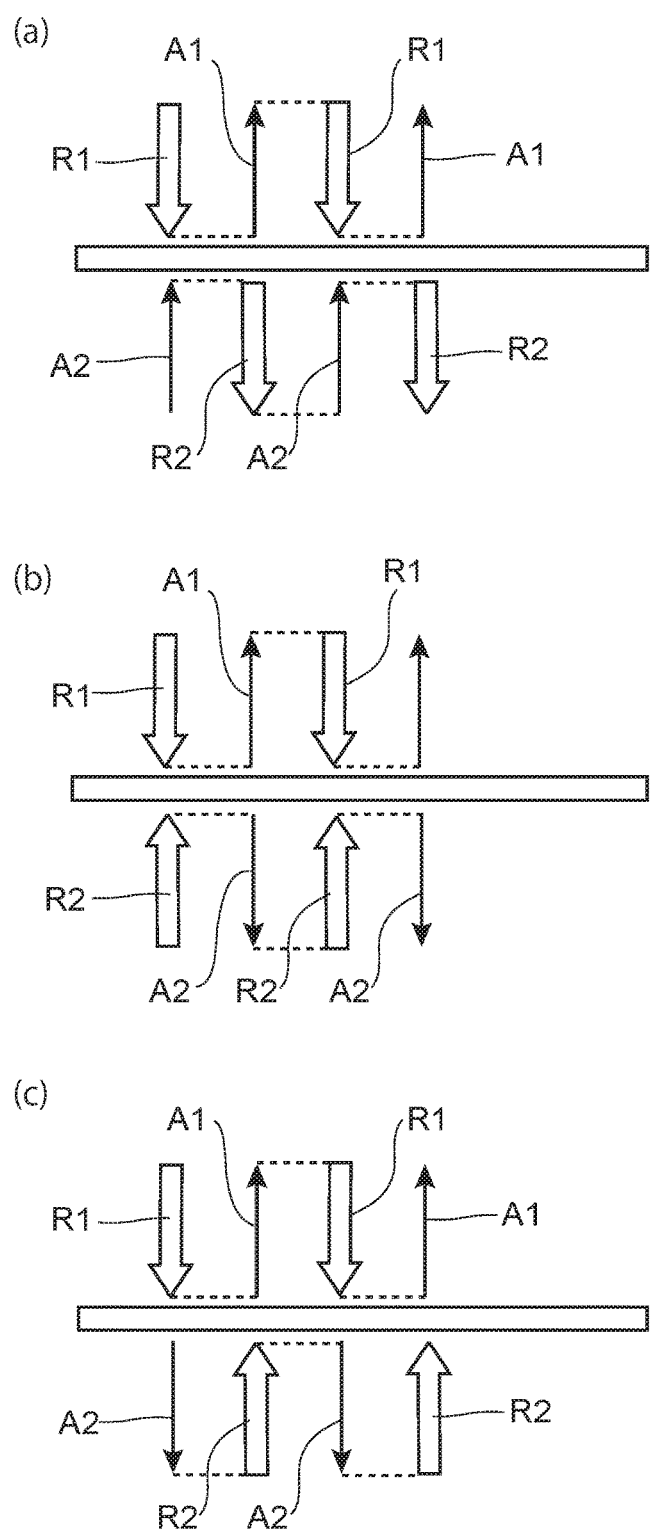
FIG. 25 (a) is a view schematically illustrating an action pattern of the rotary power generating apparatus according to the first embodiment of the present invention, FIG. 25 (b) is a view schematically illustrating the action pattern of the rotary power generating apparatus according to the second embodiment of the present invention, FIG. 25 (c) is a view schematically illustrating the action pattern of the rotary power generating apparatus according to the third embodiment of the present invention.

Therefore, the action pattern of the rotary power generating apparatus 100 is illustrated in FIG. 25 (a). Namely, in case of the rotary power generating apparatus 100, the first, second piston magnet members 60, 61 perform respectively the progress action A1 and the regress action R1, the progress action A2 and the regress action R2, with same cycle alternately, and they perform the progress actions and regress actions so that the respective progress action, regress action are not overlaid on the respective progress action, regress action. Note that in FIG. 25, directions of arrows show moving direction of the first, second piston magnet members 60, 61.

In contrast to the above, the action pattern of the rotary power generating apparatus 101 is illustrated in FIG. 25 (b). In case of the rotary power generating apparatus 101, the first, second piston magnet members 60, 61 perform respectively the progress action A1 and the regress action R1, the progress action A2 and the regress action R2, with same cycle alternately, and they perform the progress actions simultaneously, they also perform the regress actions simultaneously.

In case of the rotary power generating apparatus 101, the first, second demagnetizing belts 30, 130 are engaged with the auxiliary shafts 41a, 41b, 41c, 41d. Because of the rotary power generating apparatus 101 has a next second basic structure to realize the above action, positions, which the first, second demagnetizing belts 30, 130 are engaged with the auxiliary shafts 41a, 41b, 41c, 41d, are adjusted. The second basic structure is a structure which the first, second piston magnet members 60, 61 reaches the top dead center at the same timing, immediately after that, at the first gap, the demagnetizing magnet parts 38 of the first demagnetizing belt 30 changes to the non-magnetic force part 39, and at the second gap, the demagnetizing magnet parts 138 of the second demagnetizing belt 130 changes to the non-magnetic force part 139.

In this case, in case of the rotary power generating apparatus 101, the first, second piston magnet members 60, 61 are arranged in the contrary direction from the crankshaft 11. It is sufficient that the first, second demagnetizing belts 30, 130 are engaged with the auxiliary shafts 41a, 41b, 41c, 41d so that there is a difference in accordance with the half-rotation between the positions of the demagnetizing magnet parts 38, the non-magnetic force parts 39 and the positions of the demagnetizing magnet parts 138, non-magnetic force parts 139, along the peripheral direction (as illustrated in FIG. 6). This is because the first, second piston magnet members 60, 61 reach the top dead center at the same timing.

Then, in case of the rotary power generating apparatus 101, the first, second piston magnet members 60, 61 perform the actions repeatedly to narrow each interval and to extend it, from opposite sides of the intervening crankshaft 11. Namely, the reciprocations of the first, second piston magnet members 60, 61 are realized. Whereupon, the moment around the crankshaft 11 is generated on the crankshaft 11 via the first, second connecting rods 80, 81, thereby the crankshaft 11 performs the rotary motion.

The first, second repulsive forces operate on the first, second piston magnet members 60, 61 thereby the first, second piston magnet members 60, 61 performs the regress actions, the first, second repulsive force operate so as to impede the progress of the first, second piston magnet members 60, 61. So, the first, second repulsive forces are reduced while the first, second piston magnet members 60, 61 perform the progress action thereby the progress action is performed following the regress action so that the first, second piston magnet members 60, 61, reached the bottom dead center by the regress actions, reach the top dead center continuously, the-above is the present invention's way of thinking concerning the rotary power generating apparatus 101.

Besides the-above, because the rotary power generating apparatus 101 has the common structures with the rotary power generating apparatus 100, the rotary power generating apparatus 101 performs the common operations and effects with the rotary power generating apparatus 100.

Third Embodiment (Structure of Rotary Power Generating Apparatus)

To begin with, the structure of the rotary power generating apparatus 102 according to the third embodiment of the present invention will be explained with reference to FIG. 24.

Figure 24:
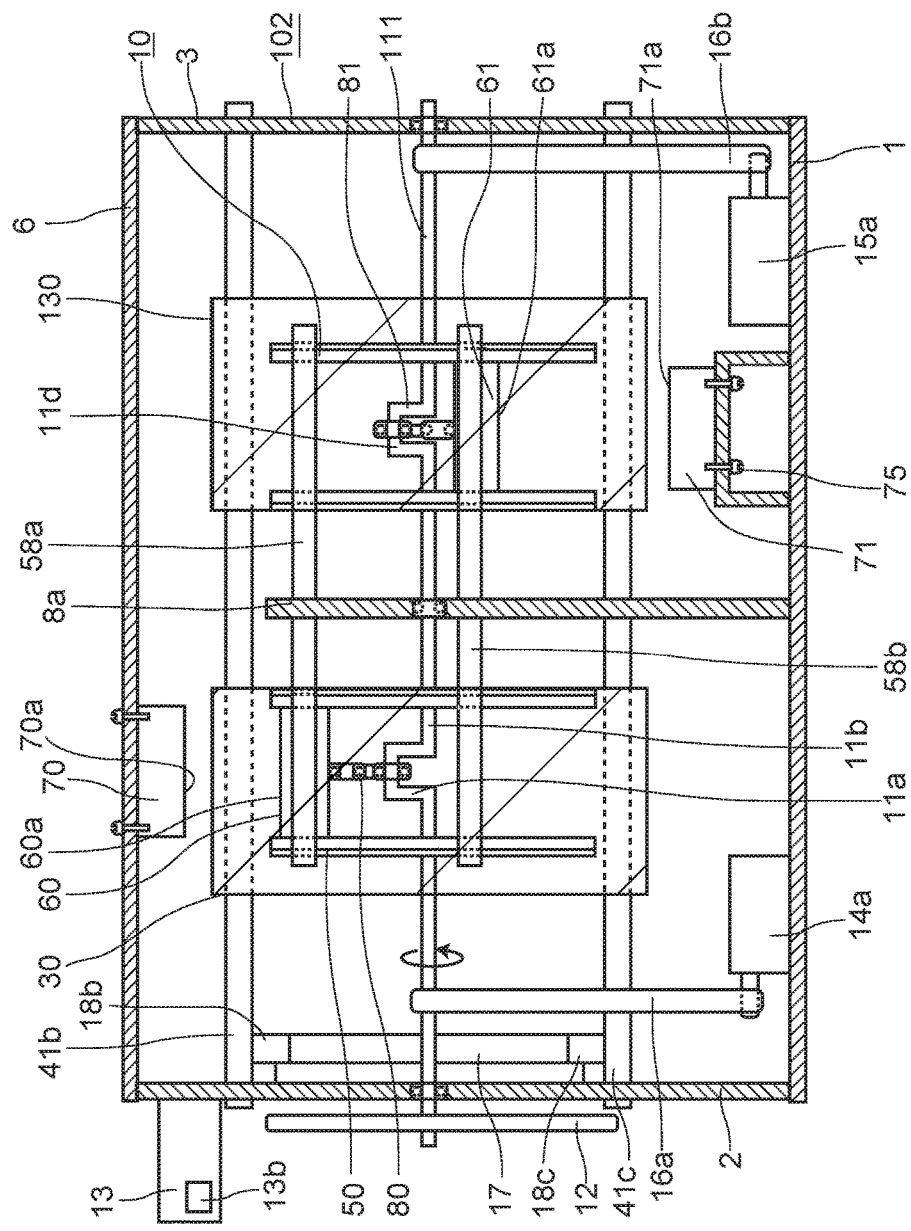
FIG. 24 is a sectional view, corresponding to FIG. 2, of the rotary power generating apparatus according to a third embodiment of the present invention.

Here, FIG. 24 is a sectional view, corresponding to FIG. 2, illustrating the rotary power generating apparatus 102 according to the third embodiment of the present invention.

The rotary power generating apparatus 102 is different from the rotary power generating apparatus 101 in that it has a crankshaft 111 instead of the crankshaft 11.

The crankshaft 111 is different from the crankshaft 11 in that it has a second crank part 11*d* instead of the second crank part 11*c*.

In case of the-above described crankshaft 11, the crank angle is set 180 degrees. On the other hand, the crank angle of the crankshaft 111 is set 360 degrees. Therefore, the second crank part 11*d* is formed on the position which the position of the crankshaft 111 along the crank rotation direction is equal to the first crank part 11*a*.

(Action Contents of the Rotary Power Generating Apparatus)

The rotary power generating apparatus 102 has also the first piston magnet member 60, the first fixed magnet member 70, the first demagnetizing belt 30, the second piston magnet member 61, the second fixed magnet member 71 and the second demagnetizing belt 130, similar with the rotary power generating apparatus 100, 101.

Therefore, the first piston magnet member 60 also performs the regress action and the progress action, and the second piston magnet member 61 also performs the regress action and the progress action, in the rotary power generating apparatus 102, similar with the rotary power generating apparatuses 100, 101

However, the timings, which the first, second piston magnet members 60, 61 of the rotary power generating apparatus 102 perform respectively the regress action and the progress action, are different from the timings, which the first, second piston magnet members 60, 61 of the rotary power generating apparatus 101 perform respectively the regress action and the progress action.

In case of the rotary power generating apparatus 101, the first, second piston magnet members 60, 61 perform respectively the progress actions A1, A2 and regress actions R1, R2 so that the progress actions, regress actions are overlaid on the progress actions, the regress actions, as illustrated in FIG. 25 (*b*).

On the other hand, in case of the rotary power generating apparatus 102, as illustrated in FIG. 25 (*c*), the first, second piston magnet members 60, 61 perform respectively the progress action A1 and regress action R1, the progress action A2 and the regress action R2, with same cycle and alternately, and they perform the actions so that the progress actions, regress actions are not overlaid on the regress actions, progress actions.

In case of the rotary power generating apparatus 102, the first, second demagnetizing belts 30, 130 are engaged with the auxiliary shafts 41*a*, 41*b*, 41*c*, 41*d*. Because of the rotary power generating apparatus 102 has a next third basic structure to realize the above action, positions, which the first, second demagnetizing belts 30, 130 are engaged with the auxiliary shafts 41*a*, 41*b*, 41*c*, 41*d*, are adjusted. The third basic structure is a structure which the second piston magnet member 61 reaches the bottom dead center at the moment when the first piston magnet member 60 reaches the top dead center, immediately after that, at the first gap, the demagnetizing magnet parts 38 of the first demagnetizing belt 30 changes to the non-magnetic force part 39, and the weak demagnetizing magnet parts 136 of the second demagnetizing belt 130 are arranged in the second gap.

In this case, the first, second piston magnet members 60, 61 are arranged in the contrary direction from the crankshaft 111. Besides, the first, second piston magnet members 60, 61 reach the top dead center alternately at every half rotation of the crankshaft 111. Therefore, it is sufficient that the first, second demagnetizing belts 30, 130 are engaged with the auxiliary shafts 41*a*, 41*b*, 41*c*, 41*d* so that there is a difference in accordance with the half-rotation between the positions of the demagnetizing magnet part 38, the non-magnetic force part 39 and the positions of the demagnetizing magnet part 138, the non-magnetic force part 139, along the peripheral direction (as illustrated in FIG. 6).

In case of the rotary power generating apparatus 102, because it has the first, second demagnetizing belts 30, 130, the first, second repulsive force, without being reduced, never operate to the first, second piston magnet members 60, 61 at the same timing.

In case of the rotary power generating apparatus 102, the first crank part 11*a* is formed on the same position of the crankshaft 111 along the crank rotation direction with the second crank part 11*d*. Therefore, if the repulsive forces, having the same strength, are applied to the first, second piston magnet members 60, 61 at the same timing, the repulsive forces operate toward the crankshaft 111 along the opposite direction, thereby the repulsive forces stand against. This cannot cause the moment of the crankshaft 111 around its axis. For generating the moment, it is necessary that the first repulsive force, operating on the first piston magnet member 60 at the same timing with the second piston magnet member 61, is different from the second repulsive force.

In point of the above, in case of the rotary power generating apparatus 102, either one of the first repulsive force or the second repulsive forces is always reduced because of the demagnetizing operation of the demagnetizing magnet parts 38, 138. Thereby, the first repulsive force, operating on the first piston magnet member 60 at the same timing with the second piston magnet member 61, is different from the second repulsive force. Accordingly, the moment of the crankshaft 111 around its axis is able to be generated because of the operation of either bigger one of the first repulsive force or the second repulsive force.

Besides the-above, because the rotary power generating apparatus 102 has the common structures with the rotary power generating apparatus 100, the rotary power generating apparatus 102 performs the common operations and effects with the rotary power generating apparatus 100.

Forth Embodiment

Figure 26:
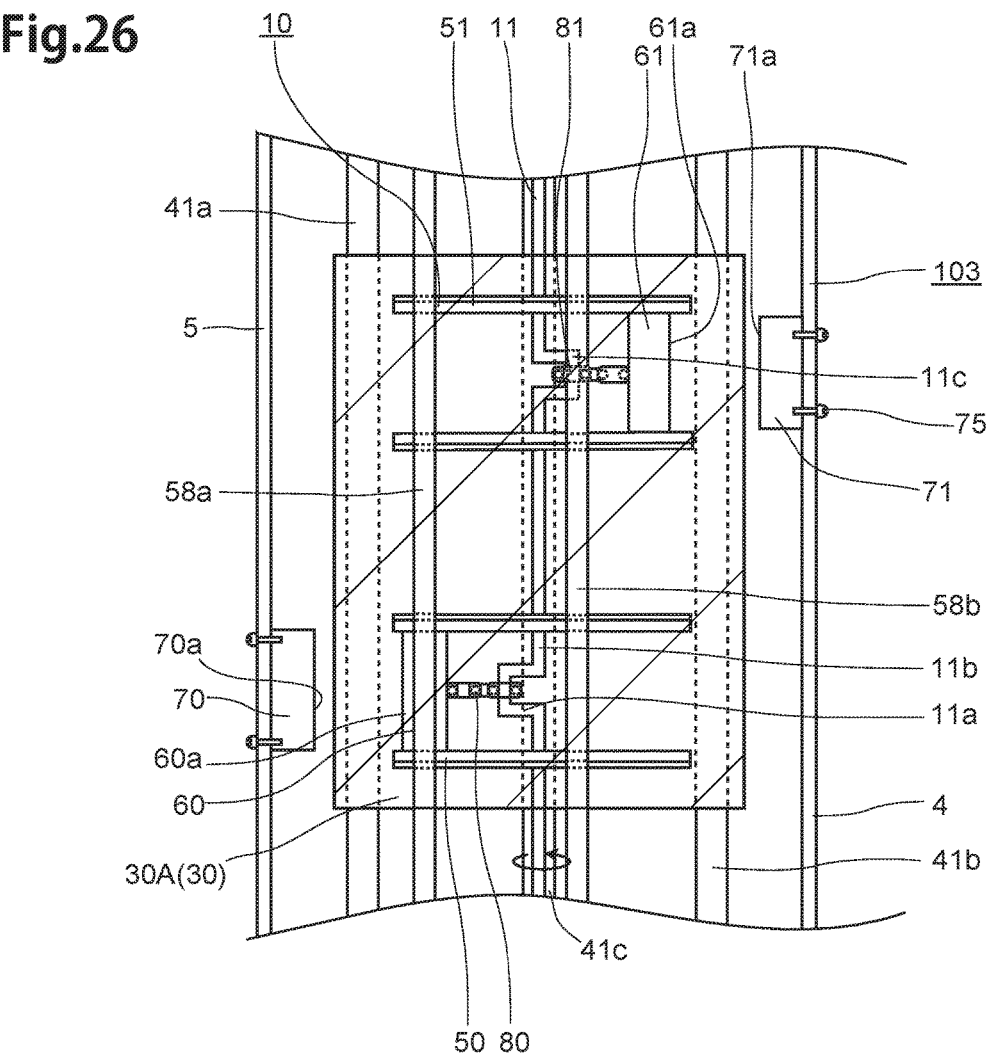
FIG. 26 is a plan view of the rotary power generating apparatus according to a forth embodiment of the present invention with a part thereof omitted.

Here, FIG. 26 is a plan view of the rotary power generating apparatus 103 according to the forth embodiment of the present invention with a part thereof omitted.

The rotary power generating apparatus 103 is different from the rotary power generating apparatus 101 in the arrangement direction of the engine part 10. Further, the rotary power generating apparatus 103 is different from the rotary power generating apparatus 101 in that the rotary power generating apparatus 103 has a common demagnetizing belt 30A instead of the first, second demagnetizing belts 30, 130, and that the rotary power generating apparatus 103 does not have the middle wall part 8a, and that the mounting boards 58a, 58b are fixed on the left wall part 2 and the right wall part 3.

In case of the rotary power generating apparatus 101, the first, second piston magnet members 60, 61 perform the progress action and the regress action along the vertical direction, however in case of the rotary power generating apparatus 103, the first, second piston magnet members 60, 61 perform the progress action and the regress action along the horizontal direction.

For realization of the above action, in case of the rotary power generating apparatus 103, the first piston magnet member 60 and the first fixed magnet member 70 are arranged on the left surface side (back wall part 5 side) of the crankshaft 11, the second piston magnet member 61 and the second fixed magnet member 71 are arranged on the right surface side (front wall part 4 side) of the crankshaft 11. Further, the first, second guide members 50, 51 are arranged along the left right direction (direction to connect the front wall part 4 with the back wall part 5). The first, second fixed magnet members 70, 71 are fixed respectively on the back wall part 5, front wall part 4.

Further, the common demagnetizing belt 30A is a member which a wide band-like member, to connect the above-described first demagnetizing belt 30 with the second demagnetizing belt 130 along the width direction, is formed circularly. The common demagnetizing belt 30A is formed so as to pass through between the top pole surface 60a and the fixed pole surface 70a, the top pole surface 61a and the fixed pole surface 71a, similar with the first, second demagnetizing belts 30, 130. It is possible that a band-like member having twice width of the first demagnetizing belt 30 is used to form the common demagnetizing belt 30A, the one half side is used as the first demagnetizing belt 30, the other half side is used as the second demagnetizing belt 130.

In case of the rotary power generating apparatus 101, the first, second piston magnet members 60, 61 are arranged respectively inside of the first, second demagnetizing belts 30, 130, however, in case of the rotary power generating apparatus 103, both of the first, second piston magnet members 60, 61 are arranged inside of the common demagnetizing belt 30A.

Because the progress action and the regress action in the rotary power generating apparatus 103 is the same with the progress action and the regress action in the rotary power generating apparatus 101 except for the direction, the rotary power generating apparatus 103 performs the same operations and effects with the above-described rotary power generating apparatus 101.

Fifth Embodiment

Figure 27:
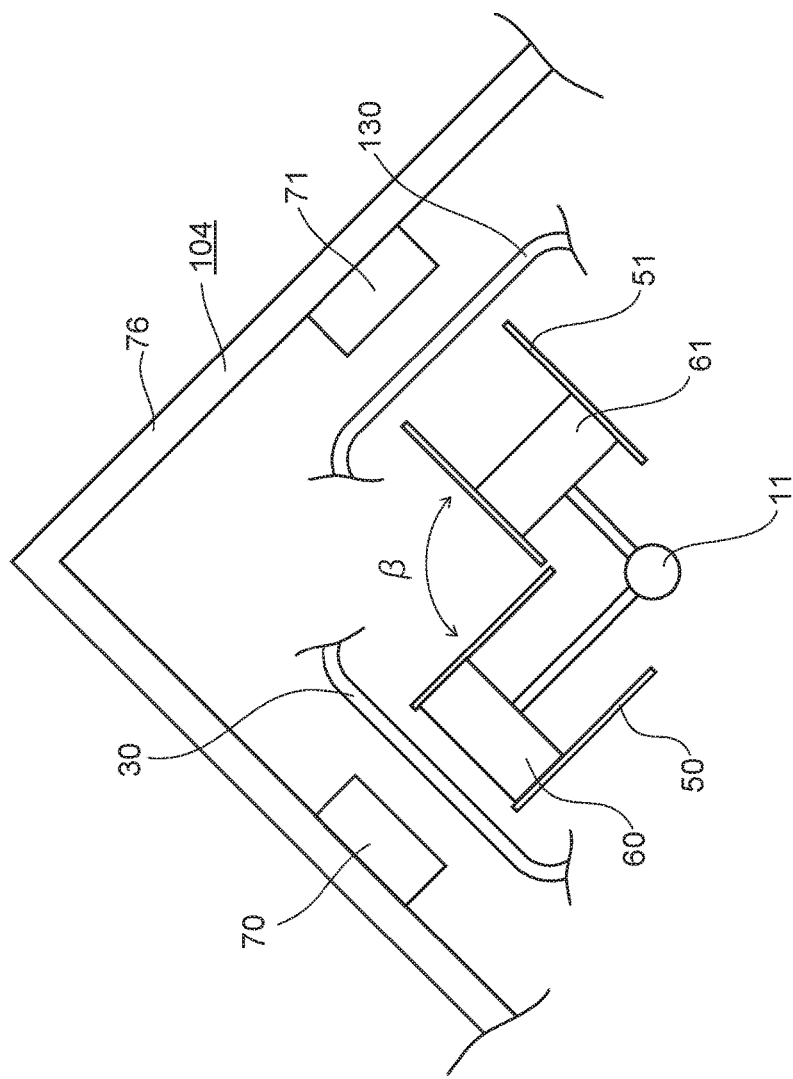
FIG. 27 is a side elevation view of the rotary power generating apparatus according to a fifth embodiment of the present invention, seen from the direction along the crankshaft, with a part thereof omitted.
Figure 28:
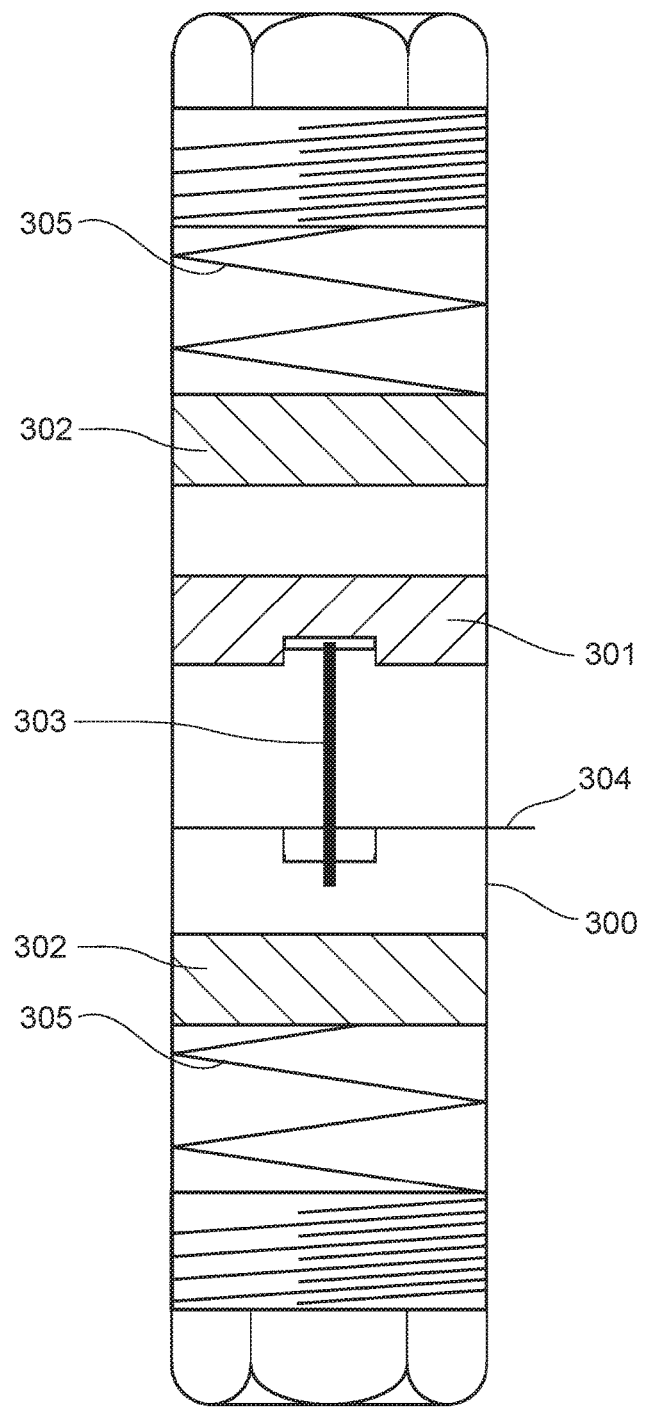
FIG. 28 is a view illustrating the conventional magnetic force movement apparatus.
Figure 30:
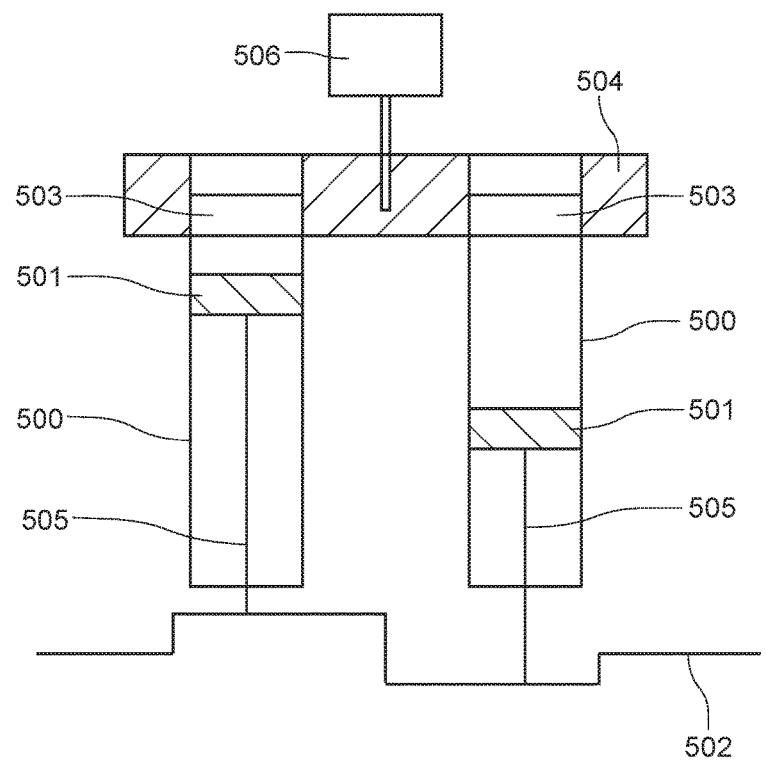
FIG. 30 is a view illustrating the conventional power transmitting machinery.
Figure 31:
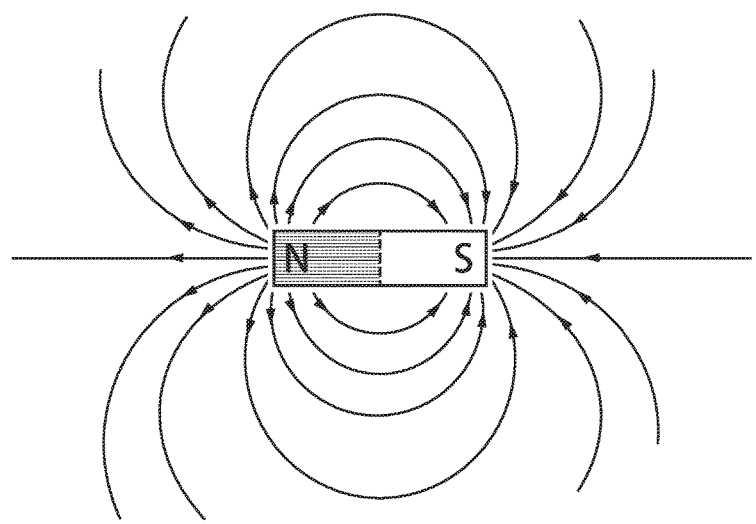
FIG. 31 is a view schematically illustrating the permanent magnet and lines of magnetic force appeared from it.
Figure 32:
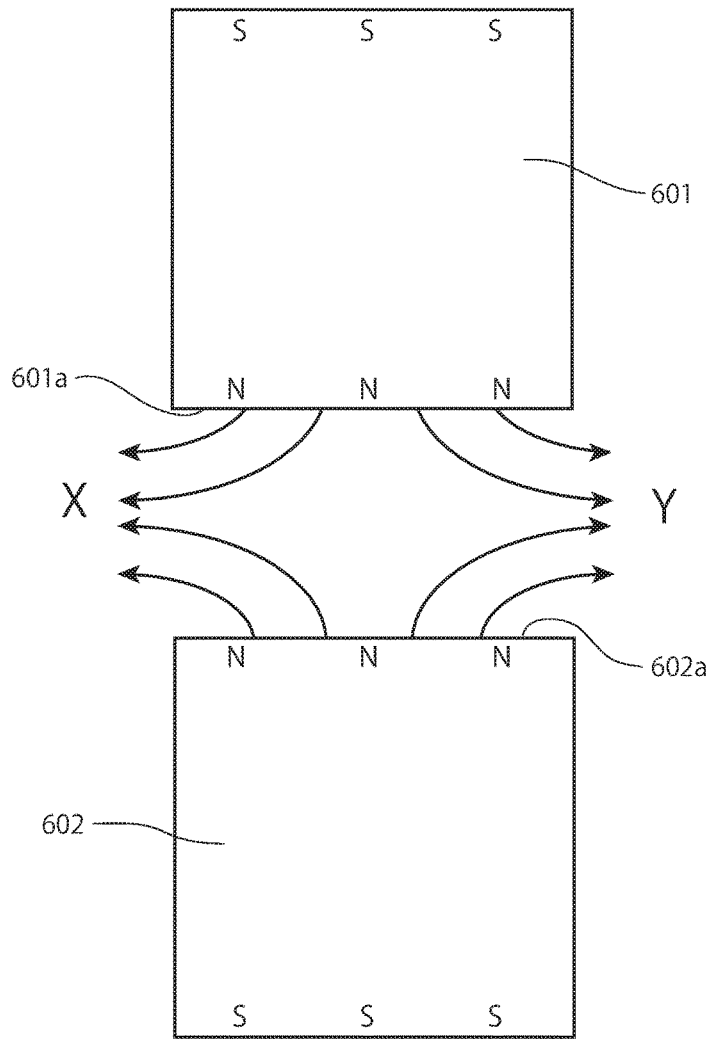
FIG. 32 is a view schematically illustrating the lines of magnetic force when the fixed magnet and the piston magnet are opposing in parallel.

FIG. 27 is a side elevation view of the rotary power generating apparatus 104 according to the fifth embodiment of the present invention, seen from the direction along the crankshaft 11. In case of the above-described rotary power generating apparatus 100, although the first, second guide members 50, 51 are arranged along the crankshaft 11 in series, in case of the rotary power generating apparatus 104, the first, second guide members 50, 51 are arranged with v-figure shape which they form a predetermined guide angle β along the crankshaft 11.

Then, the rotary power generating apparatus 104 has a slant lid part 76 which ascends from the side surface to the center, the first, second fixed magnet members 70, 71, similar with the rotary power generating apparatus 100, are fixed on the slant lid part 76. Further, the first, second guide members 50, 51 and the first, second piston magnet members 60, 61 are arranged so as to go toward the first, second fixed magnet members 70, 71.

The rotary power generating apparatus 104 has the first, second demagnetizing belts 30, 130 and a plurality of auxiliary shafts including the auxiliary shafts 41a, 41b, 41c, not illustrated in FIG. 27, with the above-mentioned first, second guide members 50, 51, the first, second piston magnet members 60, 61 and the first, second fixed magnet members 70, 71. Therefore, the first, second piston magnet members 60, 61 perform the progress action and the regress action, similar with the rotary power generating apparatus 100, in different direction though, the rotary power generating apparatus 104 shows the same operation and effect with the rotary power generating apparatus 100.

The above description is a description concerning embodiments of the present invention, do not limit the apparatus and method of the present invention, and various modified examples can be carried out easily. Further, an apparatus or method constituted from proper combining of constitution elements, function, character, method or step in each embodiment, are included in the present invention, For example, the present invention includes not only the case having two motion units, including piston magnet member, fixed magnet member, guide member and connecting rod, like the rotary power generating apparatus 100, four motion units, three motion units, like the rotary power generating apparatus 200, 201, but also the case having five motion units, six motion units, more than motion units.

Further, although the auxiliary gears 17, 18a, 18b, 18c are explained exemplarily as power transmitting members, it is preferable that not illustrated auxiliary belt is used instead of the auxiliary gears 17, 18a, 18b, 18c.

The number of the auxiliary shafts is increased than four of the auxiliary shafts 41a, 41b, 41 c, 41d, and the common demagnetizing belt 30A is engaged with all of the auxiliary shafts, thereby the number of the piston magnet members, arranged inside of the common demagnetizing belt 30A, is able to be increased than two. In this case, it is preferable that each piston magnet member is arranged in series like the rotary power generating apparatus 100, and each piston magnet member is arranged in horizontal direction like the rotary power generating apparatus 103. Further, it is possible that each piston magnet member is arranged with v-figure like the rotary power generating apparatus 104.

INDUSTRIAL APPLICABILITY

Application of the present invention provides reciprocations of the piston magnets surely and enhance the continuity, thereby the continuous rotary power is able to be obtained. The present invention is able to utilize in a field of the rotary power generating apparatus and electric generating apparatus which utilize it.

REFERENCE SIGNS LIST 10, 110, 120 . . . engine part, 11, 111 . . . crankshaft, 11A . . . common crankshaft, 15a, 15b, 15c, 15d . . . motor generator, 17, 18*a*, 18*b*, 18*c* . . . auxiliary gear, 30 . . . first demagnetizing belt, 35, 45 . . . strong demagnetizing part, 37, 137 . . . middle demagnetizing part, 36, 46 . . . weak demagnetizing part, 38, 48, 138 . . . demagnetizing magnet part, 39, 139 . . . non-magnetic force part, 41*a*, 41*b*, 41*c*, 41*d* . . . auxiliary shaft, 50 . . . first guide member, 51 . . . second guide member, 53 . . . gap part, 60 . . . first piston magnet member, 61 . . . second piston magnet member, 60*a*, 61*a* . . . top pole surface, 63 . . . holding case, 64, 74 . . . permanent magnet, 70 . . . first fixed magnet member, 70*a*, 71*a* . . . fixed pole surface, 71 . . . second fixed magnet member, 73 . . . for-fixing holding case, 75 . . . adjusting member, 79 . . . hindmost part, 80 . . . first connecting rod, 81 . . . second connecting rod, 100, 101, 102, 103, 104, 200, 201 . . . rotary power generating apparatus, 130 . . . second demagnetizing belt.

The invention claimed is:

1. A rotary power generating apparatus comprising:
    a first piston magnet member and a second piston magnet member arranged so that their polarities of magnetic poles of a top dead center side are equal;
    a first connecting rod and a second connecting rod connected with the bottom dead center side of the respective first, second piston magnet members;
    a crankshaft connected with the first, second connecting rods;
    a first guide member and a second guide member, which hold respectively the first, second piston magnet members from outside and guide the respective first, second piston magnet members during all process of reciprocation;
    a first fixed magnet member and a second fixed magnet member fixed on the positions to keep a constant interval from top pole surfaces of the top dead center side of the first, second piston magnet members, and in which fixed pole surfaces, having the same polarity with the magnetic pole of the top pole surfaces, are arranged so as to oppose the top pole surfaces of the respective first, second piston magnet members;
    a first demagnetizing band like member passing through between the top pole surface of the first piston magnet member and the fixed pole surface of the first fixed magnet member, and rotating with the crankshaft; and
    a second demagnetizing band like member passing through between the top pole surface of the second piston magnet member and the fixed pole surface of the second fixed magnet member, and rotating with the crankshaft,
    wherein the first demagnetizing band like member is a member which a transformable band like member, opposing to the top pole surface of the first piston magnet member, is formed circularly,
    wherein the second demagnetizing band like member is a member which a transformable band like member, opposing to the top pole surface of the second piston magnet member, is formed circularly,
    wherein the first, second demagnetizing band like members comprise demagnetizing magnet parts having magnetic force, weaker than the magnetic poles of the first, second piston magnet members, having different polarity from the top pole surfaces, and non-magnetic force parts, having no magnetic force, formed adjacent to the demagnetizing magnet parts;
    wherein the rotary power generating apparatus comprising:
    a repulsive force unequal structure which a hindmost interval, arranged hindmost position along a rotating direction which the crankshaft rotates, is spread than an interval of another part to weaken a repulsive force repulsing the top pole surfaces and the fixed pole surfaces in the hindmost position than the repulsive force in another part, in the top pole surfaces of the respective first, second piston magnet members and the fixed pole surfaces of the first, second fixed magnet members;
    wherein the rotary power generating apparatus further comprising:
    an auxiliary motor supplying power to the crankshaft so that reciprocation of the first, second piston magnet members become continuous.

2. The rotary power generating apparatus according to claim 1,
    wherein the demagnetizing magnet parts of the first, second demagnetizing band like members comprise strong demagnetizing parts having a strongest magnetic force, a weak demagnetizing part having a weakest magnetic force, a middle demagnetizing part having magnetic force in the middle of the strong demagnetizing parts and the weak demagnetizing parts, and a magnetic force changing structure which the strong demagnetizing parts, middle demagnetizing parts and weak demagnetizing parts are arranged sequentially along the respective rotating direction of the first, second demagnetizing band like members so that the magnetic force changes to become strong gradually along the peripheral direction.

3. The rotary power generating apparatus according to claim 1, further comprising:
    a plurality of auxiliary shafts arranged along with the crankshaft and rotating with the crankshaft; and
    a power transmitting member transmitting a power of the crankshaft to the plurality of auxiliary shafts,
    wherein the first, second demagnetizing band like members are engaged with the plurality of auxiliary shafts, and rotate with the plurality of auxiliary shafts.

4. The rotary power generating apparatus according to claim 3,
    wherein the crankshaft and the first, second connecting rods are formed so that the first, second piston magnet members reach the top dead center alternately,
    wherein the first, second piston magnet members are arranged so that the one top pole surface faces the same direction with the other top pole surface, based on the crankshaft,
    wherein the first, second demagnetizing band like members are engaged with the plurality of auxiliary shafts so that the second piston magnet member reaches the bottom dead center at the moment when the first piston magnet member reaches the top dead center, and immediately after that a part between the first piston magnet member and the first fixed magnet member, in the first demagnetizing band like member, changes from the demagnetizing magnet parts to the non-magnetic force parts, and the demagnetizing magnet part of the second demagnetizing band like member is arranged between the second piston magnet member and the second fixed magnet member.

5. The rotary power generating apparatus according to claim 3,
    wherein the crankshaft and the first, second connecting rods are formed so that the first piston magnet member reaches the top dead center at the same timing with the second piston magnet member, wherein the first, second piston magnet members are arranged so that one top pole surface faces the contrary direction with the other top pole surface, based on the crankshaft, wherein the first, second demagnetizing band like members are engaged with the plurality of auxiliary shafts so that the second piston magnet member reaches the top dead center at the moment when the first piston magnet member reaches the top dead center, and immediately after that a part between the first piston magnet member and the first fixed magnet member, in the first demagnetizing band like member, changes from the demagnetizing magnet parts to the non-magnetic force parts, and a part between the second piston magnet member and the second fixed magnet member, in the second demagnetizing band like member, changes from the demagnetizing magnet parts to the non-magnetic force parts.

6. The rotary power generating apparatus according to claim 3, wherein the crankshaft and the first, second connecting rods are formed so that the first, second piston magnet members reach the top dead center alternately, wherein the first, second piston magnet members are arranged so that one top pole surface faces the contrary direction with the other top pole surface, based on the crankshaft, wherein the first, second demagnetizing band like members are engaged with the plurality of auxiliary shafts so that the second piston magnet member reaches the bottom dead center at the moment when the first piston magnet member reaches the top dead center, and immediately after that a part between the first piston magnet member and the first fixed magnet member, in the first demagnetizing band like member, changes from the demagnetizing magnet parts to the non-magnetic force parts, and the demagnetizing magnet part of the second demagnetizing band like member is arranged between the second piston magnet member and the second fixed magnet member.

7. The rotary power generating apparatus according to claim 1, wherein the rotary power generating apparatus comprising:

a first, second engine parts respectively having the first, second guide members, the first, second piston magnet members, the first, second fixed magnet members, the first, second connecting rods, the first, second demagnetizing band like members and the crankshaft, the crankshaft of the first engine part and the crankshaft of the second engine part are constituted with a common crankshaft being common with the first engine part and the second engine part.

8. The rotary power generating apparatus according to claim 1, wherein the first demagnetizing band like member and second demagnetizing band like member are constituted with a common demagnetizing band like member being common with the first, second piston magnet members, wherein the common demagnetizing band like member is formed to pass through between the top pole surface of the first piston magnet member and the fixed pole surface of the first fixed magnet member, and pass through between the top pole surface of the second piston magnet member and the fixed pole surface of the second fixed magnet member.

9. An electric generating apparatus comprising:

a rotary power generating apparatus; and a generator, which generates an electric power with a rotary power generated by the rotary power generating apparatus, wherein the rotary power generating apparatus comprising:

a first piston magnet member and a second piston magnet member arranged so that their polarities of magnetic poles of a top dead center side are equal;

a first connecting rod and a second connecting rod connected with the bottom dead center side of the respective first, second piston magnet members;

a crankshaft connected with the first, second connecting rods;

a first guide member and a second guide member, which hold respectively the first, second piston magnet members from outside and guide the respective first, second piston magnet members during all process of reciprocation;

a first fixed magnet member and a second fixed magnet member fixed on the positions to keep a constant interval from top pole surfaces of the top dead center side of the first, second piston magnet members, and in which fixed pole surfaces, having the same polarity with the magnetic pole of the top pole surfaces, are arranged so as to oppose the top pole surfaces of the respective first, second piston magnet members;

a first demagnetizing band like member passing through between the top pole surface of the first piston magnet member and the fixed pole surface of the first fixed magnet member, and rotating with the crankshaft; and a second demagnetizing band like member passing through between the top pole surface of the second piston magnet member and the fixed pole surface of the second fixed magnet member, and rotating with the crankshaft, wherein the first demagnetizing band like member is a member which a transformable band like member, opposing to the top pole surface of the first piston magnet member, is formed circularly, wherein the second demagnetizing band like member is a member which a transformable band like member, opposing to the top pole surface of the second piston magnet member, is formed circularly, wherein the first, second demagnetizing band like members comprise demagnetizing magnet parts having magnetic force, weaker than the magnetic poles of the first, second piston magnet members, having different polarity from the top pole surfaces, and non-magnetic force parts, having no magnetic force, formed adjacent to the demagnetizing magnet parts;

wherein the rotary power generating apparatus comprising:

a repulsive force unequal structure which a hindmost interval, arranged hindmost position along a rotating direction which the crankshaft rotates, is spread than an interval of another part to weaken a repulsive force repulsing the top pole surfaces and the fixed pole surfaces in the hindmost position than the repulsive force in another part, in the top pole surfaces of the respective first, second piston magnet members and the fixed pole surfaces of the first, second fixed magnet members;

wherein the rotary power generating apparatus further comprising:

an auxiliary motor supplying power to the crankshaft so that reciprocation of the first, second piston magnet members become continuous.

\* \* \* \* \*